United States Patent
Inoue

(10) Patent No.: US 7,209,225 B2
(45) Date of Patent: Apr. 24, 2007

(54) INCLINATION ANGLE DETECTION DEVICE AND INCLINATION ANGLE DETECTION METHOD

(75) Inventor: Hideaki Inoue, Musashimurayama (JP)

(73) Assignee: Casio Computer Co., Ltd., Tokyo (JP)

(*) Notice: Subject to any disclaimer, the term of this patent is extended or adjusted under 35 U.S.C. 154(b) by 161 days.

(21) Appl. No.: 10/912,843

(22) Filed: Aug. 6, 2004

(65) Prior Publication Data

US 2005/0030523 A1    Feb. 10, 2005

(30) Foreign Application Priority Data

Aug. 8, 2003   (JP)   ............... 2003-290751

(51) Int. Cl.
  *G01B 11/26*   (2006.01)
  *G03B 21/00*   (2006.01)
  *G01C 25/00*   (2006.01)

(52) U.S. Cl. .................. 356/138; 353/40; 353/41; 353/69; 73/1.75

(58) Field of Classification Search ................. 73/1.75, 73/862.326–862.329; 353/69, 40–41; 356/112, 356/138, 139.1; 359/237, 559; 343/112
See application file for complete search history.

(56) References Cited

U.S. PATENT DOCUMENTS

| | | | | |
|---|---|---|---|---|
| 4,529,964 A | * | 7/1985 | Minami et al. | ............... 341/13 |
| 4,704,020 A | * | 11/1987 | Murakami et al. | ........... 353/122 |
| 5,760,896 A | * | 6/1998 | Suzuki | ....................... 356/3.08 |
| 6,520,647 B2 | * | 2/2003 | Raskar | .......................... 353/70 |
| 6,677,565 B1 | * | 1/2004 | Wahl et al. | ............... 250/201.3 |
| 6,862,086 B2 | * | 3/2005 | Kanemitsu | ............... 356/139.1 |
| 2003/0030757 A1 | | 2/2003 | Shim | |

FOREIGN PATENT DOCUMENTS

| JP | 2000-241874 A | 9/2000 |
|---|---|---|
| JP | 2003-57531 A | 2/2003 |
| JP | 2003-204495 A | 7/2003 |

* cited by examiner

*Primary Examiner*—Layla G. Lauchman
*Assistant Examiner*—Jarreas C. Underwood
(74) *Attorney, Agent, or Firm*—Frishauf, Holtz, Goodman & Chick, P.C.

(57) ABSTRACT

Each of a horizontal chart generating unit and a vertical chart generating unit generate eight charts #0 to #7, the bright/dark sections being placed sequentially in equal distances. Each pattern of each charts #0 to #7, is shifted little by little. Each chart #0 to #7 is sequentially projected on a screen, and each of the sensor controllers obtains an average phase difference, by obtaining the sensor data obtained by the result of measuring, from the distance-measuring sensors, and obtains the angle between an ideal screen that is vertical to a center line of distance-measuring sensors and the screen, by obtaining the distance to the two distance-measuring points on the screen, based on the obtained average phase difference. A projector control unit replaces the angles that each of the sensor controllers obtains, to inclination angles θH and θV of the screen, and supplies the angles to a trapezoidal correction unit.

9 Claims, 20 Drawing Sheets

| PHASE DIFFERENCE (bit) | 14 | 16 | 18 | 20 | 22 | 24 | 26 | 28 | 30 | 32 | 34 | 36 | 38 |
|---|---|---|---|---|---|---|---|---|---|---|---|---|---|
| DISTANCE(m) | ∞ | 6.14 | 2.53 | 1.59 | 1.16 | 0.91 | 0.75 | 0.64 | 0.56 | 0.49 | 0.44 | 0.40 | 0.37 |

INCLINATION ANGLE DETECTION DEVICE AND INCLINATION ANGLE DETECTION METHOD

BACKGROUND OF THE INVENTION

1. Field of the Invention

The present invention relates to an inclination angle detection device and an inclination angle detection method.

2. Description of the Related Art

An auto-focus camera, etc., comprises a distance-measuring sensor for measuring the distance to a photographic subject. As this kind of distance-measuring sensor, there is a passive method distance-measuring sensor, such as disclosed in Unexamined Japanese Patent Application KOKAI Publication No. 2003-57531 (page 2, page 3, and FIG. 3). As shown in FIG. 22, this kind of passive method distance-measuring sensor comprises a pair of lenses $51a$ and $51b$, and light sensor arrays $52a$ and $52b$.

The lens $51a$ and $51b$ are placed having a distance b. C1 and C2 are center lines of the lens $51a$ and $51b$. The center lines C1 and C2 match with the light ray from a photographic subject 53 that exists in a position which is infinite to the lens $51a$ and $51b$, and are parallel to each other. The light sensor arrays $52a$ and $52b$ are placed so that they are respectively vertical to the center lines C1 and C2.

Image data string L0 and R0 of the photographic subject 53 are formed to each of the light sensor array $52a$ and $52b$. In this kind of distance-measuring sensor, the distance from the lenses $51a$ and $51b$ to the photographic subject 53 is obtained by Formula 1.

$$L = \frac{b \cdot f}{(x1 + x2)} \quad \text{[Formula 1]}$$

When the photographic subject 53 is placed at a position nearer than the position infinite to the lenses $51a$ and $51b$, a phase difference (x1+x2) occurs.

The distance-measuring sensor obtains the correlation function value with a data string L1 and a data string R1 of the light sensor array $51a$, while for example shifting the data string R1 on the light sensor $51b$. Then, the lag (shift) amount from center lines C1 and C2, wherein the correlation value is local maximum, becomes the phase difference (x1+x2).

The inclination angle of the screen, as the projection surface where the projection light from the projector is projected, can be obtained by applying this kind of distance-measuring sensor to the projector. With the projector, the projection image imaged on the screen is deformed, due to the inclination angle of the screen. Therefore, the inclination angle of the screen towards the optical axis of the projection light of the projector, becomes necessary when adjusting the projection image.

In order to obtain the inclination angle of this kind of screen, the projector is constituted so that the projector comprises the distance-measuring sensor. Then, first, the projector projects chart lights, where bright/dark sections are lined, to the screen, and the distance-measuring sensor receives the reflection light from two distance-measuring windows of the charts that are projected. Next, the projector respectively measures the phase difference, in cases where reflection light is received from the two distance-measuring windows, and measures the distances to a plurality of distance-measuring points on the screen, based on the respectively obtained phase difference. If distance-measuring data to the plurality of distance-measuring points on the screen can be obtained, the inclination angle of the screen can be obtained based on this distance-measuring data.

However, with an inclination angle detection device using this kind of distance-measuring sensor, even if the distances to the plurality of distance-measuring points on the screen is measured, the detected distances change, if the projection position of the charts is slightly displaced. Therefore, even if the inclination angle of the screen surface is obtained by the detected distance, the inclination angle can not be obtained with high accuracy.

SUMMARY OF THE INVENTION

The present invention has been made in consideration of the above, and an object of the present invention is to provide an inclination angle detection device and an inclination angle detection method which can accurately detect the inclination angle of the projection surface.

To achieve the above object, an inclination angle detection device according to a first aspect of the present invention comprises:

a chart drawing unit which draws an equal distance sequential pattern chart, which has patterns so that bright sections are sequentially placed in equal distances, by sequentially projecting the projection light of the equal distance sequential pattern chart to a projection surface, while shifting the patterns;

sensor units which comprise a plurality of light receiving units that are placed having predetermined distances from each other, setting a center line as the center, and sequentially receives the reflection light of the equal distance sequential pattern charts, that are drawn on the projection surface, at the plurality of light receiving units; and inclination angle obtaining units wherein the sensor units sequentially obtain the average distance between the projection point of the projection light and equal distance sequential pattern charts, based on a plurality of phase differences at the time when the reflection light of the equal distance sequential pattern chart is received, the sum of each lag amount between the imaging position on the light receiving unit when the sensor unit receives a parallel light, and the imaging position on the light receiving unit when the sensor unit receives the reflection light of the equal distance pattern chart being set as the phase difference, and obtain the inclination angle of the projection surface based on the obtained average distance.

An inclination angle detection method according to a second aspect of the present invention comprises:

a drawing step of drawing an equal distance sequential pattern chart, which has patterns so that bright sections are sequentially placed in equal distances, by sequentially projecting the projection light of the equal distance sequential pattern chart to a projection surface, while shifting the patterns;

a light receiving step of sequentially receiving reflection light from the equal distance sequential pattern charts drawn on the projection surface, at receiving units that are placed having predetermined distances from each other; and an inclination obtaining step of sequentially obtaining the average distance between the projection point of the projection light and equal distance sequential pattern charts, based on a plurality of phase differences at the time when the reflection light of the equal distance sequential pattern chart is received, the sum of each lag amount between the imaging position on the light receiving unit when the sensor unit receives a parallel light, and the imaging position on the light receiving unit when the sensor unit receives the reflection light of the equal distance pattern chart being set as the phase difference, and obtaining the inclination angle of the projection surface based on the obtained average distance.

According to the present invention, an inclination angle detection device and an inclination angle detection method which can accurately detect the inclination angle of the projection surface, can be provided.

BRIEF DESCRIPTION OF THE DRAWINGS

This object and other objects and advantages of the present invention will become more apparent upon reading of the following detailed description and the accompanying drawings in which.

DETAILED DESCRIPTION OF THE PREFERRED EMBODIMENTS

First Embodiment

Figure 1:
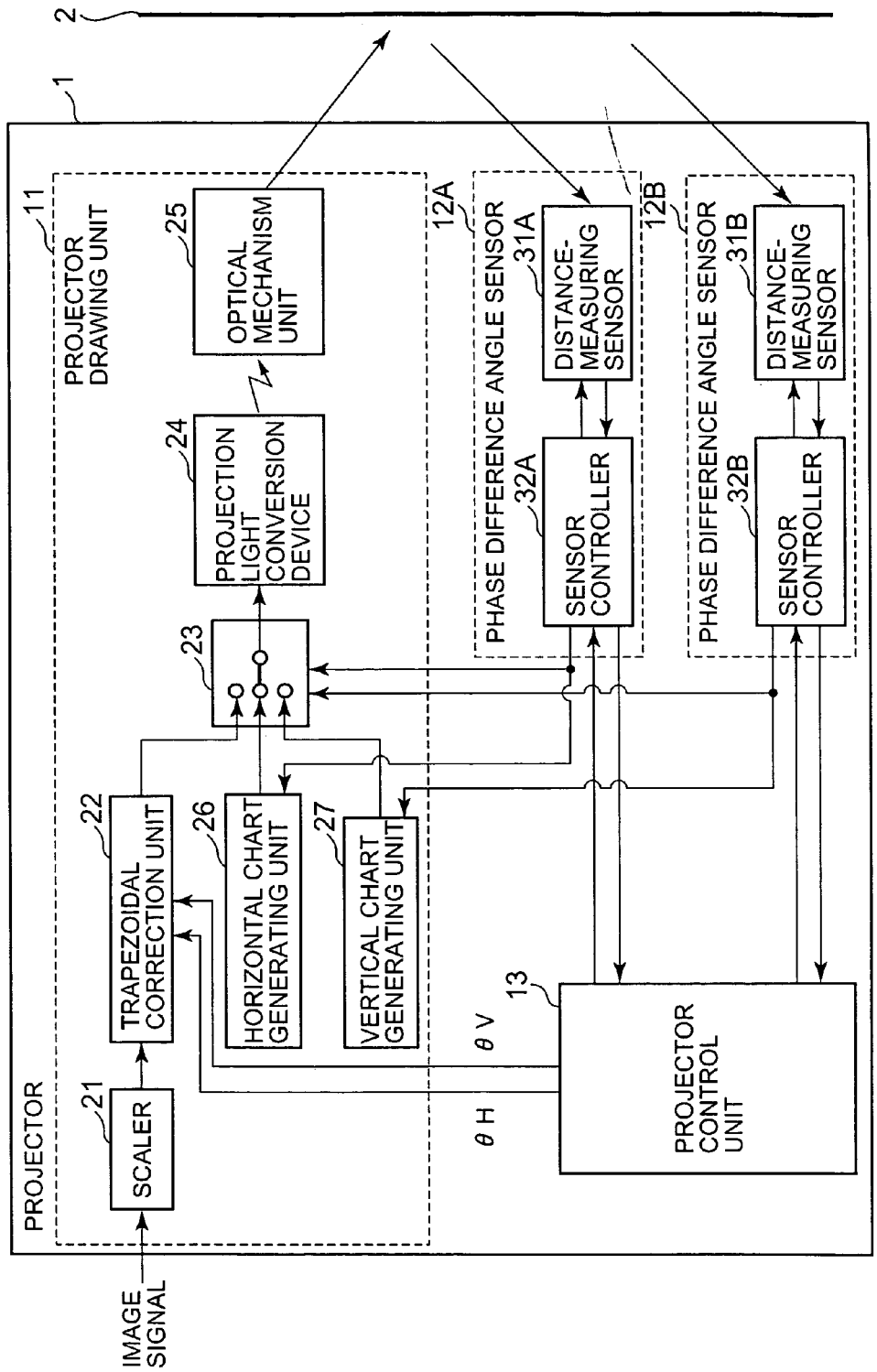
FIG. 1 is a block diagram showing a structure of a projector according to the first embodiment of the present invention.

A structure of a projector according to a first embodiment of the present invention is shown in FIG. 1.

A projector 1 according to the first embodiment of the present invention, comprises a projector drawing unit 11, phase difference angle sensors 12A and 12B, and a projector control unit 13.

The projector drawing unit 11 is for projecting a projection image based on a chart or an input image signal, to a screen 2, and is constituted by comprising a scaler 21, a trapezoidal correction unit 22, a signal selection unit 23, a projection light converting unit 24, an optical mechanism unit 25, a horizontal chart generating unit 26, and a vertical chart generating unit 27.

The scaler 21 adjusts the resolution of the input image signal.

The trapezoidal correction unit 22 carries out trapezoidal correction towards the image signal, which the scaler 21 adjusted the resolution thereof.

The trapezoidal correction unit 22 sets to an inner side of a projection image projected on the screen 2, before being adjusted, a position and shape of the projection image after being adjusted, based on inclination angles θH and θV of the screen 2. Then, the trapezoidal correction unit 22 carries out trapezoidal correction by projective transformation of the image signal, time sequentially. The inclination angle θH is an inclination angle in a horizontal direction of the screen 2 towards the optical axis of the projection light, and the inclination angle θV is an inclination angle in a vertical direction of the screen 2.

Trapezoidal correction carried out by the trapezoidal correction unit 22 will now be described.

Figure 2:
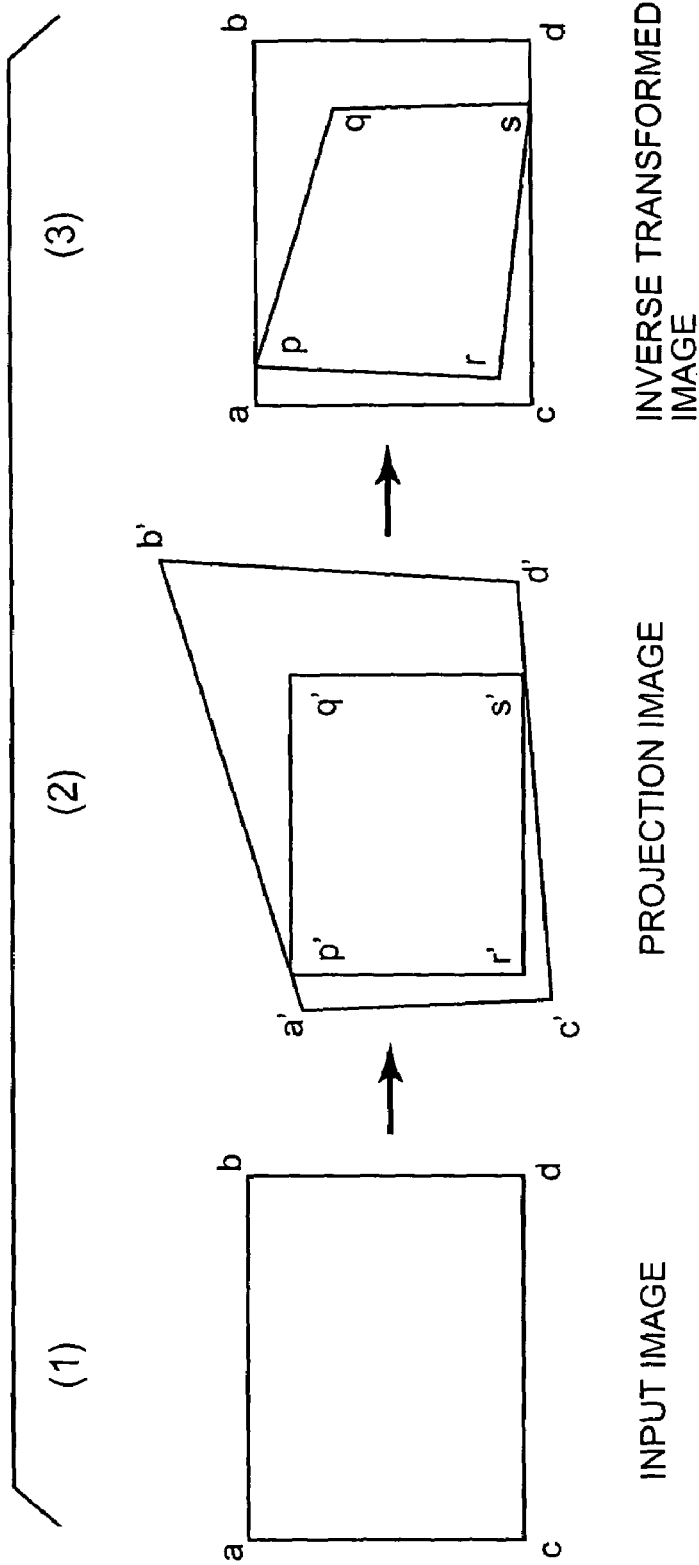
FIG. 2 is a diagram showing operation of a trapezoidal correction unit shown in FIG. 1, wherein (1) indicates an input image, (2) indicates a projection image, and (3) indicates an inverse transformed image.

It is assumed that an image signal of an image of a quadrangle abcd such as shown in FIG. 2 (1) is supplied, and because the screen 2 is inclined by inclination angle θH and θV towards the optical axis of the projection light, the projection image on the screen 2 becomes a quadrangle a'b'c'd' such as shown in FIG. 2 (2). The trapezoidal correction unit 22 cuts a quadrangle p'q'r's' so that it is placed inside the quadrangle a'b'c'd'. The trapezoidal correction unit 22 transforms the quadrangle p'q'r's' inversely, and generates an inverse transformed image pqrs, such as shown in FIG. 2 (3). By projecting the inverse transformed image pqrs to the screen 2, a projection image without distortion is imaged on the screen 2.

The signal selection unit 23 selects and outputs one of, the horizontal chart that the horizontal chart generating unit 26 generates, the vertical chart that the vertical chart generating unit 27 generates, and the projection image that the trapezoidal correction unit 22 generates.

The projection light conversion device 24 converts the image signal that the signal selection unit 23 selects and outputs, to a projection light.

The optical mechanism 25 carries out focus control so that an image is imaged on the screen 2, and projects the projection light that the projection light conversion device 24 converts, on the screen 2.

Figure 3:
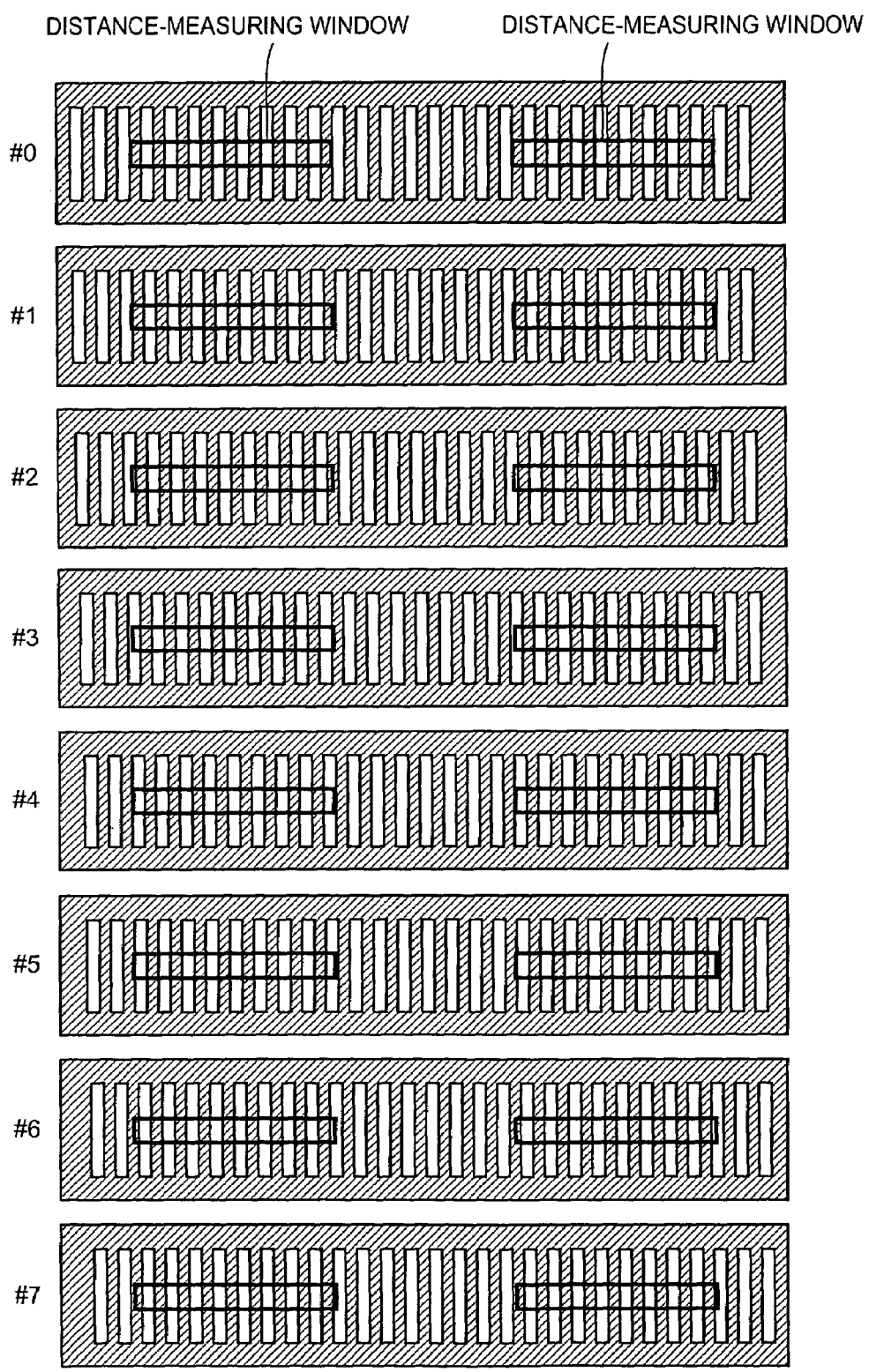
FIG. 3 is a diagram showing horizontal charts that a horizontal chart generating unit shown in FIG. 1 generates.

The horizontal chart generating unit 26 generates charts # 0 to # 7 that are projected on the screen 2, such as shown in FIG. 3.

These horizontal charts are projected when measuring the distance to a plurality of distance-measuring points that are in a horizontal direction towards a horizon surface.

In FIG. 3, in each chart, the white quadrangles represent the bright sections of the charts, and the shaded portions represent the background and the dark sections of the charts. The distance between the center of the bright section of each chart to the center of the bright section next to that bright section is 1 pitch. This chart pitch is set based on the size of the charts #0 to #7 projected on the screen 2, and resolution, etc., of a distance-measuring sensor 31A. The two distance-measuring windows shown by a frame, in FIG. 3, indicate the area that the phase difference angle sensor 12A carries out distance-measuring in a left to right direction of the projection image.

The patterns of each chart #0 to #7 are shifted little by little. These kinds of charts # 0 to # 7 are sequentially projected on the screen 2 to negate the error margin components of the charts, and to raise the accuracy of the inclination angles θA and θH.

The reason for this will be described.

The lag amount (shift amount) of each chart can be expressed by chart pitch (iteration interval). If 1 pitch of each chart is 360 degrees, and the number of charts is eight, as shown in FIG. 3, the lag amount of each chart #0 to #7 is 360÷8=45 degrees, being divided evenly.

When expressing the lag of each chart by a degree, setting chart # 0 as a standard, the degree of each lag of charts #0 to #7 is 0 degrees, 45 degrees, 90 degrees, 135 degree 180 degrees, 225 degrees, 270 degrees, and 315 degrees.

Figure 4:
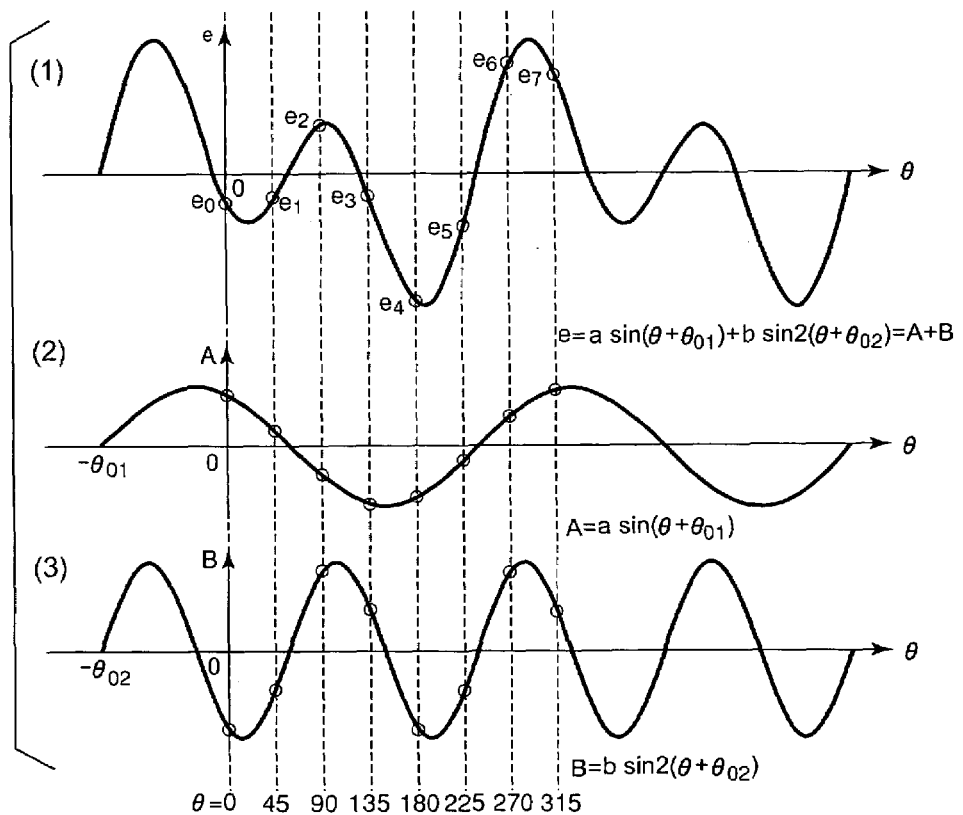
FIG. 4 is a diagram showing error margins, in a case where a sensor controller shown in FIG. 1 obtains the average phase difference.

The error margin component shown in FIG. 4 (1) is approximately decomposed to the error margin component A of FIG. 4 (2) and the error margin component B shown in FIG. 4 (3). This result is gained as a result of an experiment.

Namely, a phase difference error margin component e is expressed by Formula 2.

$$e = a \cdot \sin(\theta + \theta_{01}) + b \cdot \sin(\theta + \theta_{02})$$ [Formula 2]

However, the first term represents the error margin component A, and the second term represents the error margin component B, θ is a degree of lag with chart #0 as a standard, $\theta_{01}$ and $\theta_{02}$ are initial lags of the chart #0, and a and b are constant numbers that are determined by the chart pitch and optical attribute, etc.

If the chart is selected so that the relational formula shown in Formula 3 is established, the error margin can be made smaller.

$$\sum_{k=o}^{n-1} \sin(\theta_k + \theta_{01}) = 0$$ [Formula 3]

-continued $$\sum_{k=0}^{n-1} \sin 2(\theta_k + \theta_{02}) = 0$$

In this regard, n is the number of charts, and is a multiple number of 2, equal to or larger than 4, k is the chart number 0 to n−1, and $\theta_k$ is the degree of lag when chart #0 of chart #k is the standard.

By selecting the chart in this way, the error margins of charts #0 to #7 are negated, by averaging both the error margin that occurs in a same cycle as the cycle of the lag, and the error margin that occurs in half the cycle of the lag. If the error margin of charts #0 to #7 become smaller, the accuracy of the accuracy of the inclination angles θH and θV becomes higher.

Returning to FIG. 1, the vertical chart generating unit 27 generates eight vertical charts that are projected on the screen 2, such as shown in FIG. 3.

These vertical charts are projected when measuring the distance to a plurality of distance-measuring points that are in a vertical direction towards the horizon surface.

Each of the phase difference angle sensors 12A and 12B measures the distance to a plurality of distance-measuring points that are in a vertical direction and a horizontal direction to a measuring line, on the screen 2, and obtains the inclination angles θA and θB of the screen 2, based on the measured distance. The inclination angles θA and θB are angles indicated by angle $\theta_s$ shown in FIG. 5, and are inclination angles between an ideal screen that is perpendicular to a center line CO (a line that connects points of equal distance from each center of a lens 51a and a lens 51b, shown in FIG. 22), of the phase difference angle sensors 12A and 12B (distance-measuring sensors 31A and 31B) that extends toward the screen 2, and the actual screen 2 (line that connects measuring points P1 and P2 on the screen 2).

The phase difference angle sensor 12A comprises a distance-measuring sensor 31A, and a sensor controller 32A. The phase difference angle sensor 12B comprises a distance-measuring sensor 31B, and a sensor controller 32B.

Figure 22:
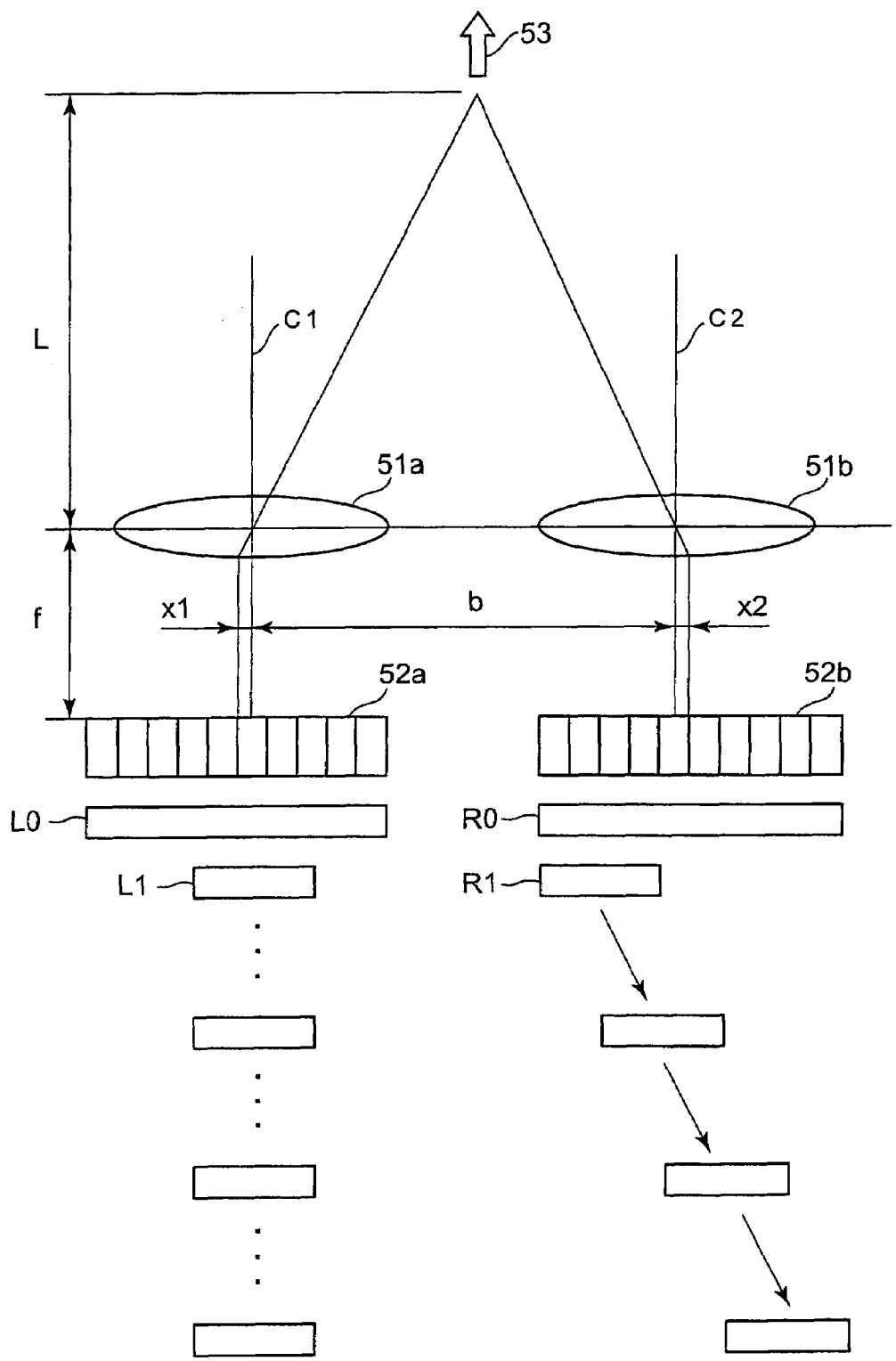
FIG. 22 is a diagram for describing operation of the distance-measuring sensor.

The distance-measuring sensors 31A and 31B receives the reflection light from the distance-measuring window of screen 2, and conventionally, as shown in FIG. 22, are used for measuring the distance to the distance-measuring points on the screen 2. These distance-measuring sensors 31A and 31B are sensors of a phase difference format, which has multi-distance-measuring functions that can measure distances of a plurality of directions.

Figure 5:
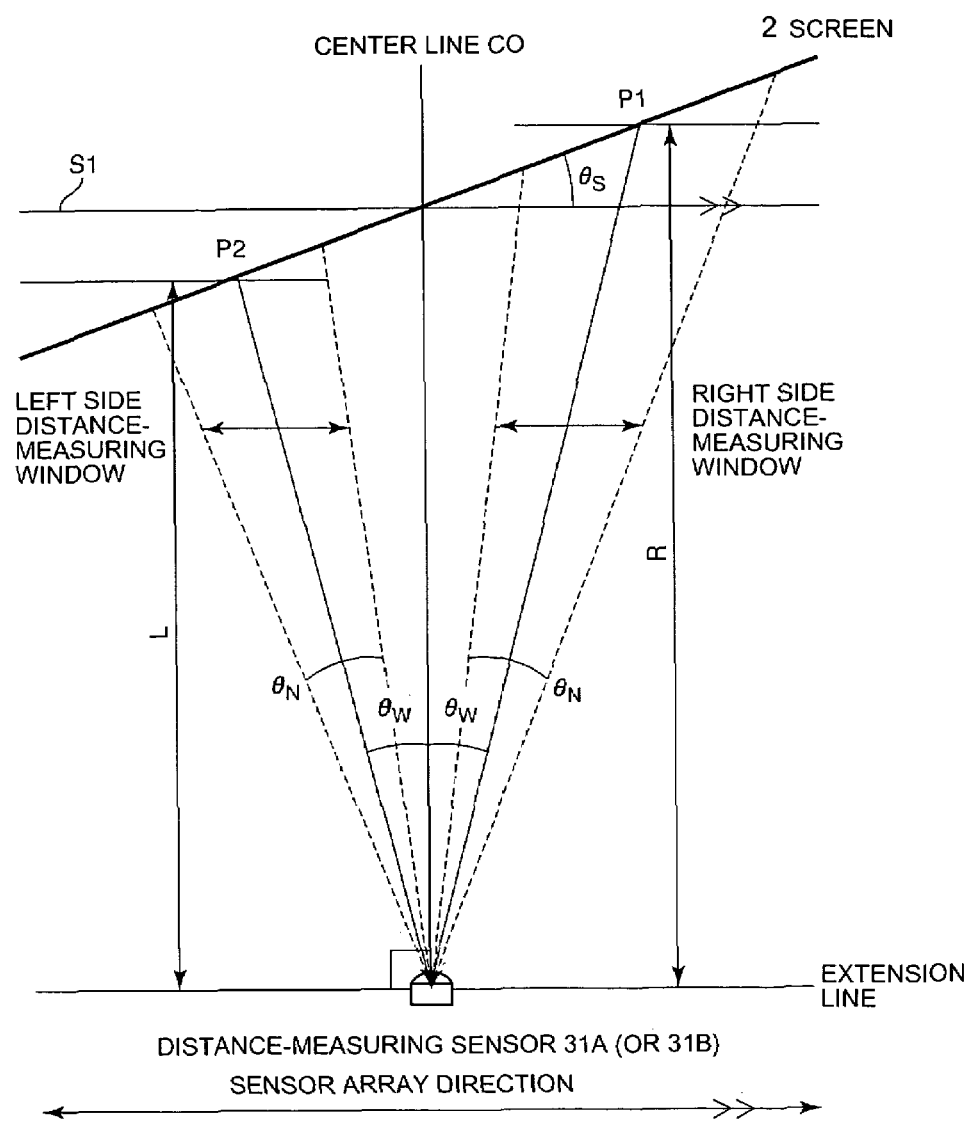
FIG. 5 is a diagram showing a position relationship of the projector and screen shown in FIG. 1.

In a case where the signal selection unit 23 selects a horizontal chart, as shown in FIG. 5, the distance-measuring sensors 31A and 31B receive reflection light from center points P1 and P2 of the two distance-measuring windows on the screen 2, that are positioned left and right with an angle θw, towards the center line CO of the distance measuring sensors 31A and 31B.

In FIG. 5, the surface indicated by S1 is an ideal screen surface that the center line CO of the distance-measuring sensors 31A and 31B penetrate vertically, and θs is the inclination angle of the screen 2, to the ideal screen surface. Each of R and L indicates the distance between the projector 1 and distance-measuring points P1 and P2 in the distance-measuring window. Angle θw indicates the angle between the center line CO of the distance-measuring sensors 31A and 31B, and each of the distance-measuring points P1 and P2, and θN indicates the angle corresponding to the width of each distance-measuring window, shown in FIG. 3.

Considering the distance-measuring sensor 31A, when the distance-measuring sensor 31A receives reflection light from the center point P1 of the right distance-measuring window on screen 2, the image of the chart in the right distance-measuring window, shown in FIG. 3, is formed on light sensor arrays 52a and 52b, shown in FIG. 22.

Figure 6:
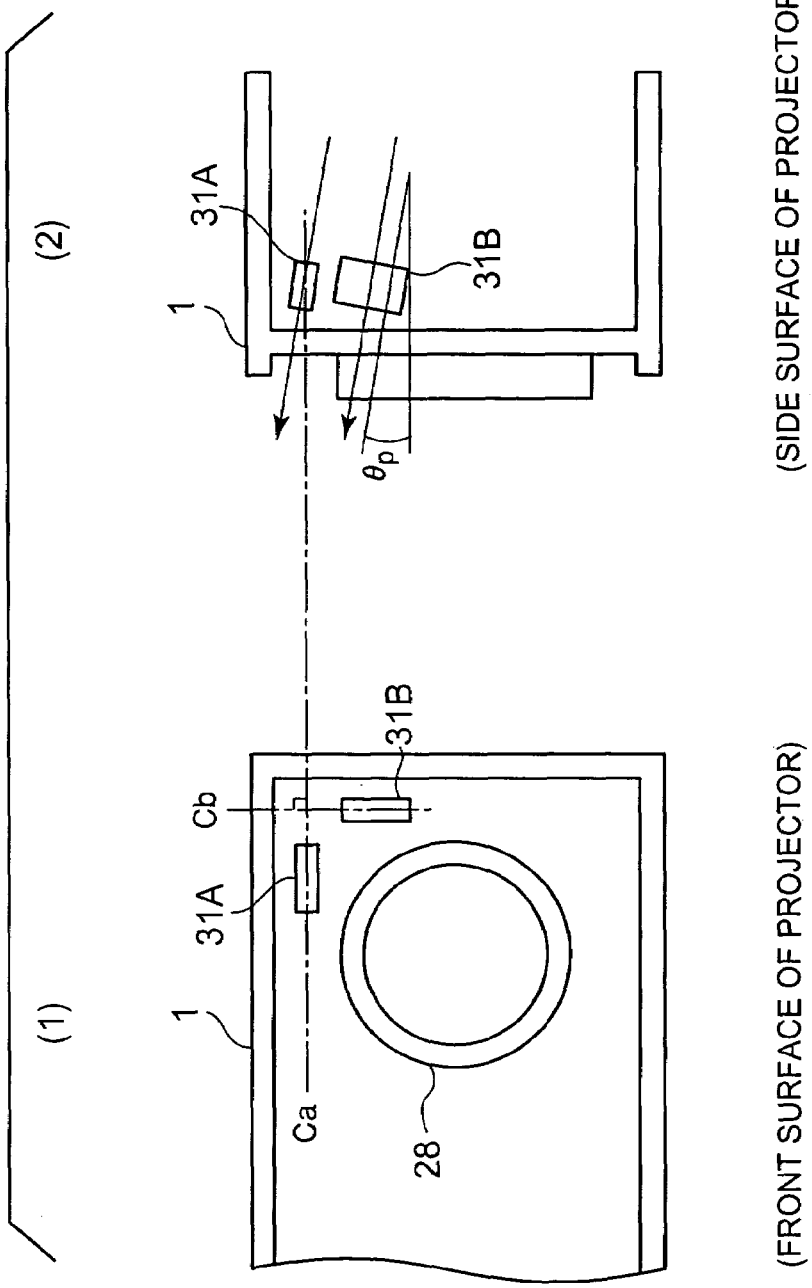
FIG. 6 is a diagram showing a fixing position of the projector and distance-measuring sensor shown in FIG. 1, wherein (1) is a front surface view of the projector, and (2) is a side surface view of the projector.

As shown in FIG. 6 (1), the distance-measuring sensors 31A and 31B are placed near a projection lens 28, so that the center lines Ca and Cb (lines that connect the center points of the two light sensor arrays 52a and 52b) are perpendicular.

As shown in FIG. 6 (2), an elevation angle towards an optical axis of the projection light of the projector 1 of the distance-measuring sensors 31A and 31B, is assumed to be θp. The elevation angle θp is not limited to be a positive value, and may be a negative value, or zero.

In a case where the elevation angle θp is zero, the optical axis of the projection lens 28 and the center line CO of the distance-measuring sensors 31A and 31B match, and the S1 shown in FIG. 5 becomes an ideal screen surface which is vertical to the center line of the projection lens 28. However, in a case where the elevation angle θp is not zero, the ideal screen surface of the projection lens 28 and the ideal screen surface of the distance-measuring sensors 31A and 31B do not match.

Each of the distance-measuring sensors 31A and 31B supplies the received light to the sensor controllers 32A and 32B, as sensor data.

The sensor controller 32A controls the horizontal chart generating unit 26, the signal selection unit 23, and the distance-measuring sensor 31A to obtain the inclination angle θA. The sensor controller 32B controls the vertical chart generating unit 27, the signal selection unit 23, and the distance-measuring sensor 31B, to obtain the inclination angle θB.

In a case where the sensor controller 32A obtains the inclination angle θA, the sensor controller 32A sequentially outputs horizontal charts #0 to #7 as horizontal chart drawing instructions for drawing the horizontal charts, to the signal selection unit 23. Then, the sensor controller 32A outputs a sensor control signal to the distance-measuring sensor 31A, for the distance-measuring sensor 31A to carry out sensor operation, and obtains eight sensor data from the distance-measuring sensor 31A, in a case where reflection light from the charts #0 to #7 are received.

The sensor controller 32A obtains the correlation value of the two data string of the two left and right light sensor arrays 52a and 52b of the distance-measuring sensor 31A, such as shown in FIG. 22, and obtains each phase difference by obtaining the local maximum value. The sensor controller 32A obtains the average phase difference, by averaging the eight phase difference, and obtains the average distance to points P1 and P2, based on the obtained average phase difference.

The distance to the distance-measuring points is obtained by the average phase difference, using formula 4.

$$L = f1(AL) = K1 \div (AL + K2)$$

$$R = f2(AR) = K3 \div (AR + K4) \quad \text{[Formula 4]}$$

In regard to this formula:
K1, K2, K3 and K4 are constant values;
L is a distance to point P2 of the left side distance-measuring window;
R is a distance to point P1 of the right side distance-measuring window;
AL is the average phase difference (left side); and
AR is the average phase difference (right side).

Further, as shown in FIG. 5, the sensor controller 32A obtains the angle θs of the ideal screen surface and the actual screen 2, by using Formula 5.

$$\theta s = f3(L, R) = \arctan\left(\frac{R-L}{R+L} \cdot \cot \theta_w\right) \quad \text{[Formula 5]}$$

The sensor controller 32A supplies the obtained angle θs as the inclination angle θA, to the projector control unit 13.

In the same way as the sensor controller 32A, in a case where the sensor controller 32B obtains the inclination angle θB, the sensor controller 32B sequentially outputs vertical charts #0 to #7 as vertical chart drawing instructions for drawing the horizontal charts, to the signal selection unit 23. Then, the sensor controller 32B obtains eight sensor data from the distance-measuring sensor 31B, and in the same way as the sensor controller 32A, obtains the angle θs. The sensor controller 32B supplies the obtained angle θs as the inclination angle θB, to the projector control unit 13.

The projector control unit 13 controls the projector 1, and obtains inclination angles θH and θV based on the inclination angles θA and θB, each supplied from the sensor controllers 32A and 32B. In a case where the projector control unit 13 obtains the inclination angles θH and θV, the projector control unit 13 outputs a sensor operation starting order to each of the sensor controllers 32A and 32B.

Inclination angles θH and θV can be obtained by replacing inclination angles θH and θV with inclination angles θA and θB, based on the relational formula shown in Formula 6.

$$\theta_H = \arctan(\tan \theta_A \cdot \cos \theta_B)$$

$$\theta_V = \theta_B - \theta_P \quad \text{[Formula 6]}$$

Then, the projector control unit 13 supplies the obtained inclination angles θH and θV of the screen 2, to the trapezoidal correction unit 22.

Next, operation of the projector 1, according to the first embodiment, will be described.

In a case where the projector control unit 13 obtains the inclination angles θH and θV of the screen 2, the projector control unit 13 sends a sensor operation starting order to each of the sensor controller 32A and 32B.

When the sensor controllers 32A and 32B receive the sensor operation starting order from the projector control unit 13, each of the phase difference angle sensors 12A and 12B executes processing for obtaining the inclination angles θA and θB.

Figure 7:
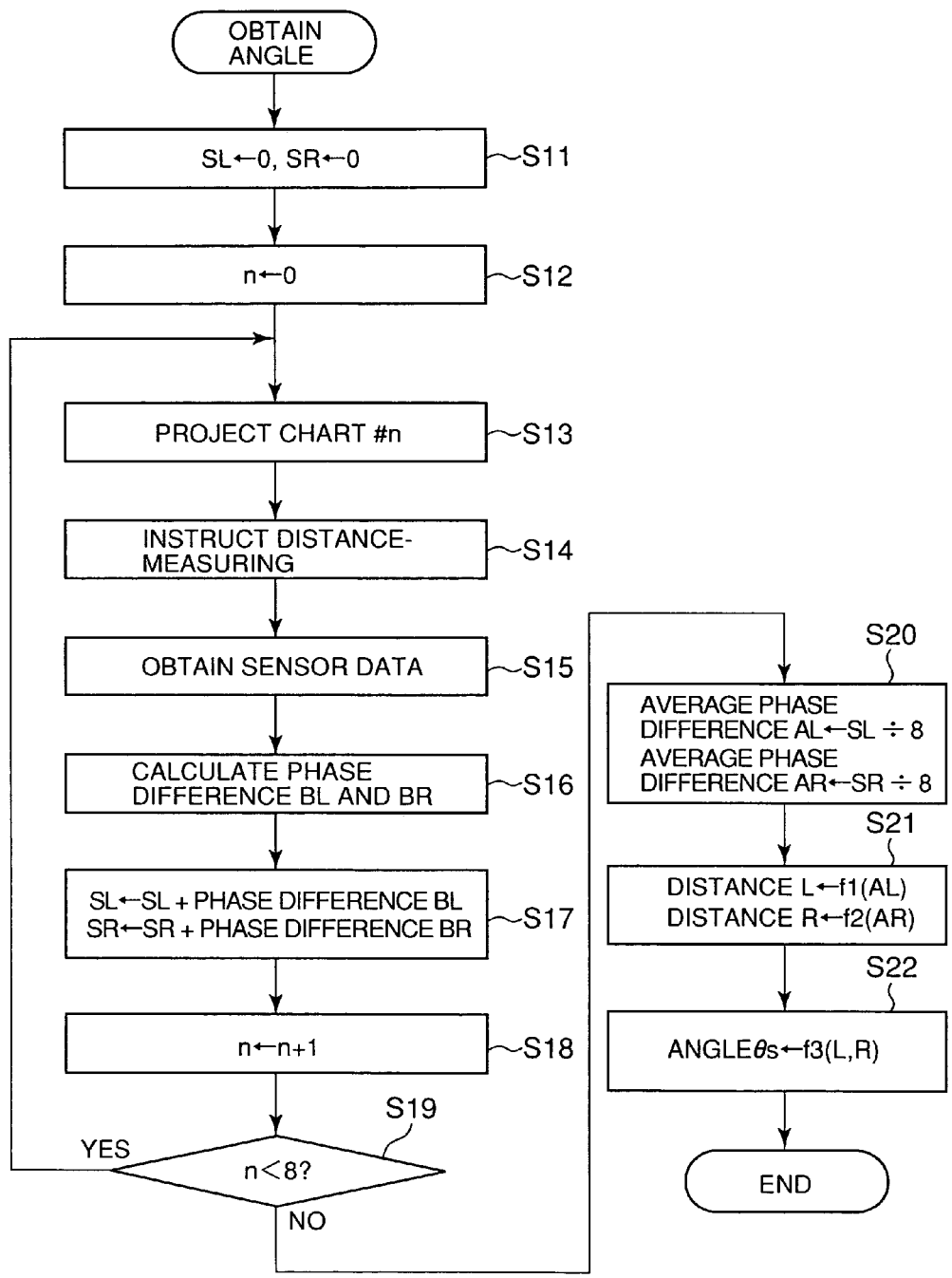
FIG. 7 is a flowchart showing operation of a phase difference angle sensor shown in FIG. 1.

First, the sensor controller 32A obtains the inclination angle θA, based on the flowchart shown in FIG. 7.

The phase difference when measuring the distances to points P2 and P1 is each set as BL and BR, and the sensor controller 32A sets the total values SL and SR of the phase differences BL and BR to zero (step S11).

The sensor controller 32A sets the count number n to zero (step S12). The count number n indicates the number of times the distance to the chart on the screen 2 is measured.

The sensor controller 32A outputs a horizontal chart drawing instruction to the signal selection unit 23, so as to project the chart #n (step S13). The signal selection unit 23 receives the instruction from the sensor controller 32A, and selects and outputs the chart #n that the horizontal chart generating unit 26 generates.

The projection light conversion device 24 converts the chart #n that the signal selection unit 23 selects and outputs, to a chart projection light.

The optical mechanism unit 25 carries out focus control, etc. The chart projection light of the chart #n that the projection light conversion device 24 converts, is projected towards the screen 2.

The sensor controller 32A controls the distance-measuring sensor 31A, so as to carry out distance-measuring (step S14). The distance-measuring sensor 31A measures the distances L, R, to the measured distance-measuring points P2 and P1, and supplies the sensor data to the sensor controller 32A.

The sensor controller 32A obtains the distances L and R from the distance-measuring sensor 31A (step S15).

The sensor controller 32A obtains phase differences BL and BR based on the obtained distances L and R (step S16).

The sensor controller 32A adds phase differences BL and BR to the phase difference total values SL and SR, and retains the added values as new phase difference total values SL and SR (step S17).

The sensor controller 32A increments the count number n by one (step S18).

The sensor controller 32A determines whether the count number n is smaller than 8 (n<8) (step S19).

In a case where it is determined that the count number n is smaller than 8, (step S19, YES), the sensor controller 32A once again executes the processing of steps S13 to S18.

By the sensor controller 32A sequentially executing the processing of steps S13 to S18, the sensor controller 32A determines that the count number is not smaller than 8, when the count number n becomes 8 (step S19, NO).

In a case where it is determined that the count number n is not smaller than 8, the sensor controller 32A divides each of the phase difference values SL and SR by 8, and obtains average phase differences AL and AR, as the quotients thereof (step S20).

The sensor controller 32A obtains distances L and R, in accordance with Formula 4 (step S21).

The sensor controller 32A obtains the angle θs, in accordance with Formula 5 (step S22).

The sensor controller 32A supplies the obtained angle θs as the inclination angle θA, to the projector control unit 13, and ends this processing.

The sensor controller 32B carries out the same processing as the sensor controller 32A. Namely, the sensor controller 32B controls the signal selection unit 23, controls the distance-measuring sensor 31B, and obtains the angle θs, based on the sensor data obtained from the distance-measuring sensor 31B. Then, the sensor controller 32B supplies the θs, as the inclination angle θB, to the projector control unit 13.

The projector control unit 13 replaces the inclination angles θA and θB, which are each supplied from the sensor controllers 32A and 32B, with inclination angles θH and θV, in accordance with the relational Formula 6.

Because the inclination angles θH and θV, obtained by the projector control unit 13, are values obtained based on average phase differences, by measuring the distances to the charts #0 to #7, the average value of the error margin e becomes approximately zero. Therefore, the accuracy of the inclination angles θH and θV, becomes higher.

The projector control unit 13 supplies the inclination angles θH and θV of the screen 2, to the trapezoidal correction unit 22 of the projector drawing unit 11.

The trapezoidal correction unit 22 carries out trapezoidal correction based on the inclination angles θH and θV of the screen 2. In a case where the signal selection unit 23 selects the output signal of the trapezoidal correction unit 22, the projection light converting unit 24 converts the image signal adjusted by the trapezoidal correction unit 22, to a projection light, and projects the projection light to the screen 2, via the optical mechanism unit 25. A projection image that is accurately adjusted, is imaged on the screen 2.

As described above, according to the first embodiment of the present invention, in a case where inclination angles θH and θV of the screen 2 are to be obtained, the projection light conversion device 24 respectively projects the eight charts that the horizontal chart generating unit 26 and the vertical chart generating unit 27 generate, on the screen 2. The sensor controllers 32A and 32B obtain the average phase difference, based on the sensor data from the distance-measuring sensors 31A and 31B, and obtains the distance to the distance-measuring points P1 and P2 of the distance-measuring windows on the screen 2, based on the obtained average phase difference.

Therefore, the phase difference error margin component of the obtained average phase difference becomes zero, by being negated, and the distance to the distance-measuring points P1 and P2 can be accurately measured. Based on the distances obtained in this way, highly accurate inclination angles θH and θV of the screen 2 can be obtained.

Because the actual chart is projected by the projector 1, there are cases where selection of the lag of each chart, the chart #0 being the standard, is subjected to restriction. Namely, in a digital projector which uses an LCD or a DMD (Digital Micromirror Device; trademark), because the charts can be displayed in pixel units, there are cases where the charts can not be displaced by 45 degrees.

In this case, instead of adopting eight values that are displaced by 45 degrees in each chart, the inclination angles θH and θV become more accurate by selecting two sets of four values divided by 90 degrees.

For example, the lag amount of each charts #0 to #7, the chart #0 being the standard, is set at 0 degree, 30 degrees, 90 degrees, 120 degrees, 180 degrees, 210 degrees, 270 degrees, and 300 degrees.

By setting the lag amount of the charts in this way, means that a set of 0 degree, 90 degrees, 180 degrees, and 210 degrees, and a set of 30 degrees, 120 degrees, 210 degrees, and 300 degrees, is provided.

The number of charts may be six. In a case where the number of charts is six, the lag amount of each chart is set at 0 degrees, 60 degrees, 120 degrees, 180 degrees, 240 degrees, and 300 degrees, the chart #0 being the standard, as the charts #0 to #5.

Namely, if Formula 4 is generalized, error margin ek is expressed by Formula 7.

$$e_k = a \cdot \sin(\theta_k + \theta_{01}) + b \cdot \sin(\theta_k + \theta_{02}) \qquad \text{[Formula 7]}$$

If the lag amount of charts #0 to #n−1 is set so that the error margin ek becomes the relationship shown in Formula 3, the average phase difference error margin E becomes zero, such as shown in Formula 8. Namely, by averaging the error margin ek, the error margin is negated.

$$E = \frac{1}{n}\sum_{k=0}^{n-1} e_k = 0 \qquad \text{[Formula 8]}$$

Figure 8:
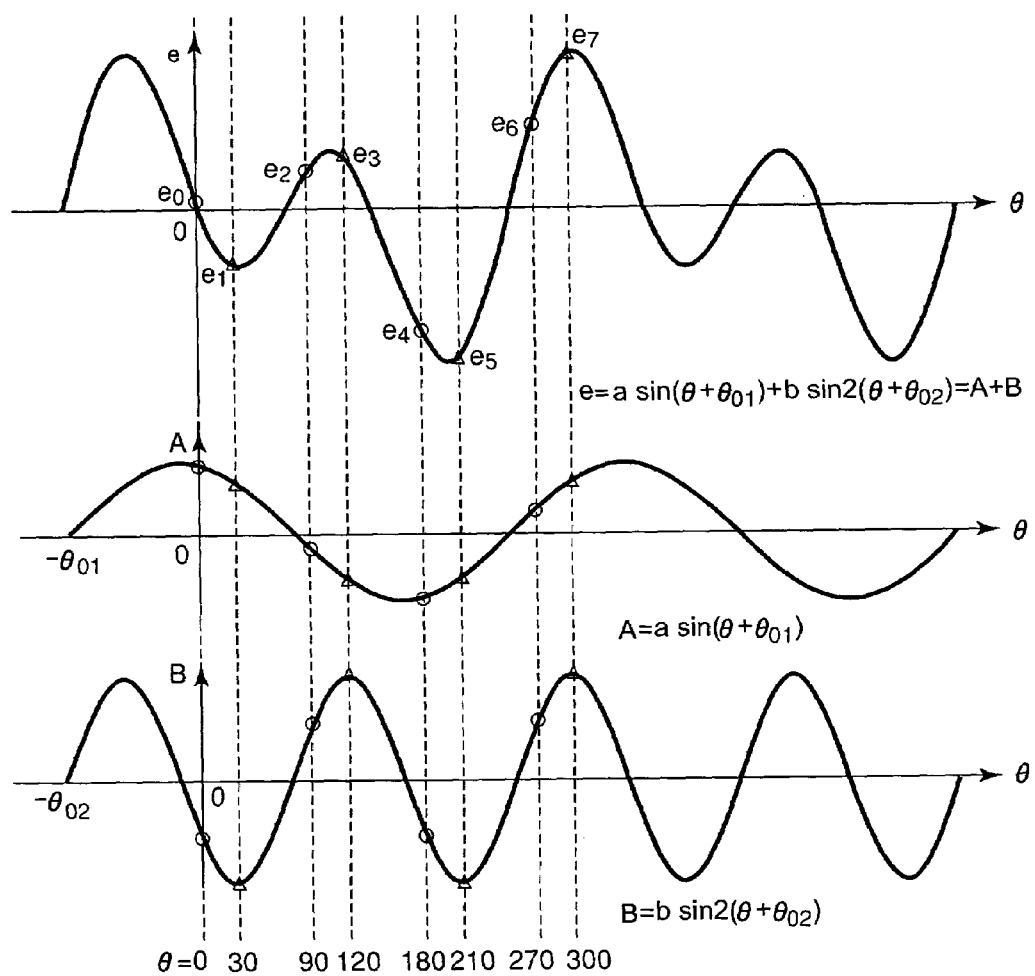
FIG. 8 is a diagram showing error margins in a case where the sensor controller shown in FIG. 1 which changes the lag amount of the charts shown in FIG. 3, obtains the average phase difference.

FIG. 8 is a diagram indicating the error margin component, in a case where the lag amount of the charts #0 to #7 is each set at 0 degree, 30 degrees, 90 degrees, 120 degrees, 180 degrees, 210 degrees, 270 degrees, and 300 degrees. As shown in FIG. 8, in this case also, where the lag amount of each chart is set in this way, the error margin is negated.

Figures 9, 10:
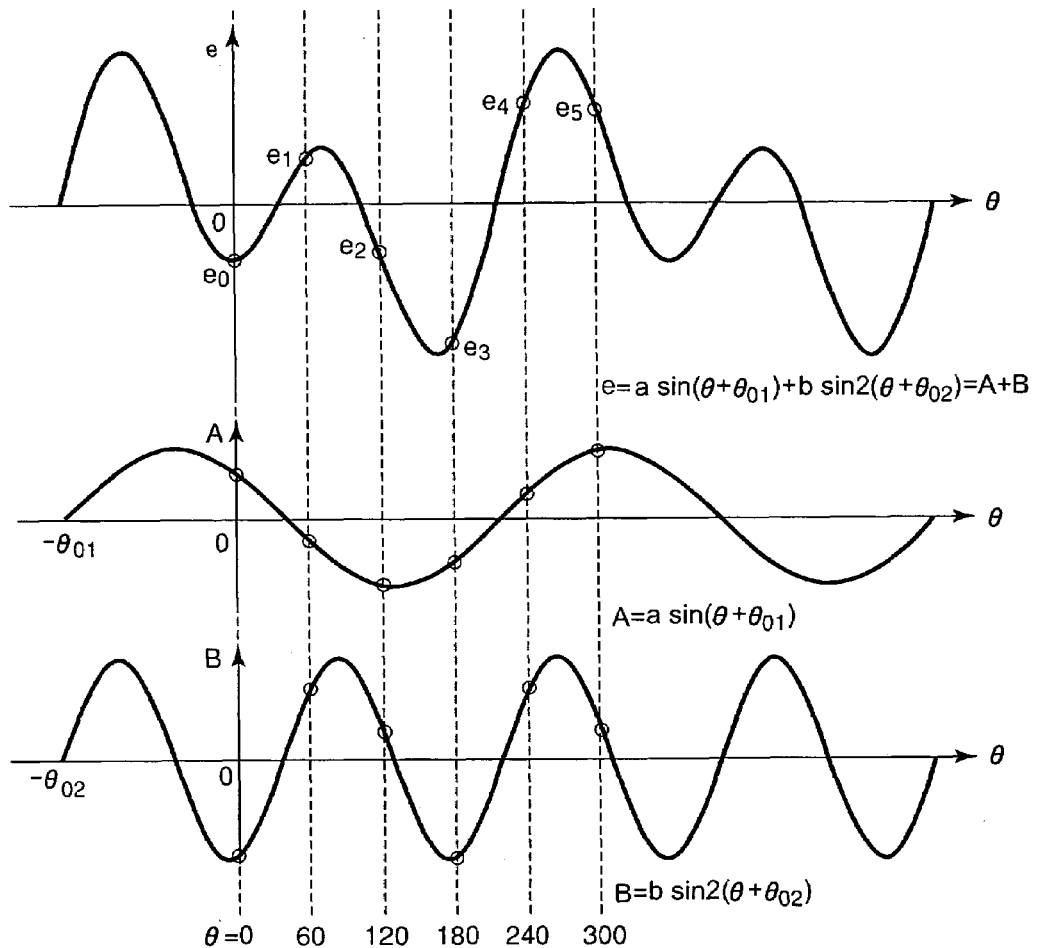
FIG. 9 is a diagram showing error margins in a case where the sensor controller shown in FIG. 1 which changes the lag amount of the charts shown in FIG. 3, obtains the average phase difference.
FIG. 10 is a diagram for describing the relationship between the distance that is to be measured, and the phase difference.

FIG. 9 is a diagram indicating the error margin component, in a case where the lag amount of the charts #0 to #5 is each set at 0 degree, 60 degrees, 120 degrees, 180 degrees, 240 degrees, and 300 degrees. It can be seen that the error margin E becomes zero, by averaging the error margin ek. Though, in a case where the number of charts is six, accuracy is somewhat inferior than the case where the number of charts is eight, a highly accurate distance can be measured.

In a case where the projector 1 has a zooming mechanism, and the zoom variable range is wide, the fluctuation of the chart pitch thereby, needs to be controlled small. Because the charts are projected by the projection light, the pitch changes influenced by the zooming, but because the distance-measuring sensors 31A and 31B are independent from the optical system of the projector 1, they are not influenced by the zooming. At this time also, the accuracy becomes higher by selecting two sets of four values divided by 90 degrees.

Second Embodiment

A projector according to the second embodiment of the present invention, carries out pre-distance-measuring, in order to prevent mistaken distance-measuring resulting from equal distance sequential stripped pattern charts.

First, occurrence of mistaken distance-measuring, will be described.

For example, it is assumed that the phase difference and the distance of the results measured by the distance-measuring sensors 31A and 31B, are in a corresponding relationship, such as shown in FIG. 10.

In a case where the distance-measuring range is 0.6 to 6 meters, the searching range of the phase difference becomes 16 to 30 bits, when corresponding the distance-measuring range to the searching range of the phase difference.

Figure 11:
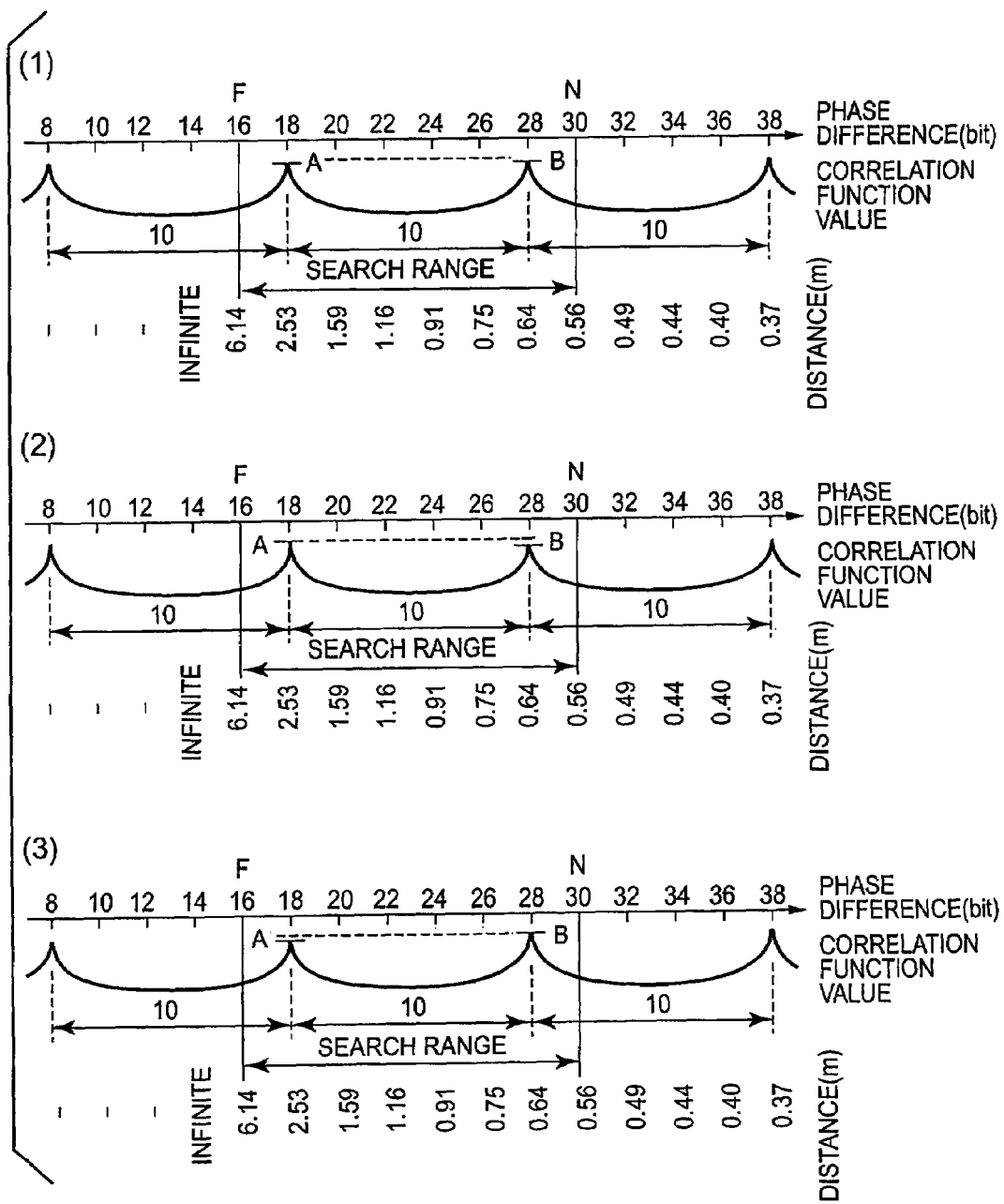
FIG. 11 is a diagram for describing mistaken distance-measuring, in a case where pre-distance-measuring is not carried out, in the second embodiment of the present invention.

When the distance-measuring sensors 31A and 31B shifts a data string R1 on the light sensor array 51*b*, shown in FIG. 22, and obtains the correlation value of the data string L1 of the light sensor array 51*a* and the data string R1, as shown in FIG. 11 (1), the correlation function value that the distance-measuring sensors 31A and 31B obtain, has local maximum values, in the same distances as the pitch of each chart. The correlation function value is a value obtained by each of the distance-measuring sensors 31A and 31B obtaining the correlation of data strings of the two light sensor arrays 52*a* and 52*b* that the distance-measuring sensors 31A and 31B comprise. The local maximum values appear periodically, because the charts #0 to #7 that the distance-measuring sensors 31A and 31B receive, have equal distance sequential stripped patterns.

F is a far side limit of phase difference from the distance-measuring sensors 31A or 31B, and is 16 bits, and N is a near side limit of phase difference from the distance-measuring sensors 31A or 31B, and is 30 bits. The phase difference which the correlation function value becomes local maximum, is searched in this phase difference searching range.

As described above, each pitch of the charts #0 to #7 shown in FIG. 3, is set by the size of the charts #0 to #7 projected on the screen 2, and the relationship, etc., with resolution of the distance-measuring sensors 31A and 31B. In a case where measuring is carried out using an equal distance sequential stripped pattern chart, where 1 pitch is a sensor pixel conversion of 10 bit width, the local maximum value of correlation function value exists every 10 bits.

As shown in FIG. 11 (1), in a range of 16 to 30 bits as a searching range, even if a local maximum value A of a correlation function value exists at a phase difference of 18 bits, there is a case where a local maximum value B of a correlation function also exists at a phase difference of 28 bits, which is 10 bits away. In this case, the sensor controllers 32A and 32B determine that the phase difference which corresponds to the larger local maximum value of either local maximum value A or local maximum value B, as the correct value. The magnitude relation of the local maximum value A and the local maximum value B is determined by the slight position relation of the pixels, between the charts and the distance-measuring sensors 31A and 31B, and does not always correspond to the actual distance.

In this way, in a case where a local maximum value A and a local maximum value B exist in the searching range, it can cause mistaken distance-measuring. For example, as shown in FIG. 11 (2), if the local maximum value A is slightly larger than the local maximum value B, there is a case where the sensor controllers 32A and 32B determine that the distance is 2.53 meters, even though the actual distance is 0.64 meters.

Also, as shown in FIG. 11 (3), if the local maximum value B is larger than the local maximum value A, there is a case where the sensor controllers 32A and 32B determine that the distance is 0.64 meters, even though the actual distance is 2.53 meters.

In order to prevent this mistaken distance-measuring, the projector 1 according to the second embodiment carries out pre-distance-measuring by once displaying an un-sequential chart, before carrying out the real distance-measuring described in the first embodiment.

Figure 12:
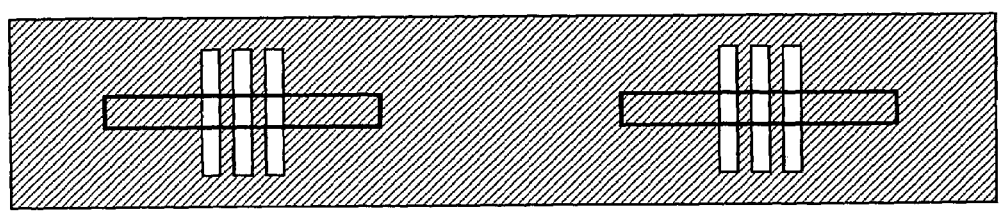
FIG. 12 is a diagram showing an un-sequential chart that is used in pre-distance-measuring.

Namely, the horizontal chart generating unit 26 of the projector 1 according to the second embodiment generates an un-sequential chart, such as shown in FIG. 12. This chart includes bright sections which are un-sequential in a left to right direction. In other words, in the chart shown in FIG. 12, groups, each of which is made of three bright sections (stripes), are arranged un-sequentially in a left to right direction. The vertical chart generating unit 27 also generates the same kind of chart, each including three bright sections, as a pre-distance-measuring chart.

Figure 13:
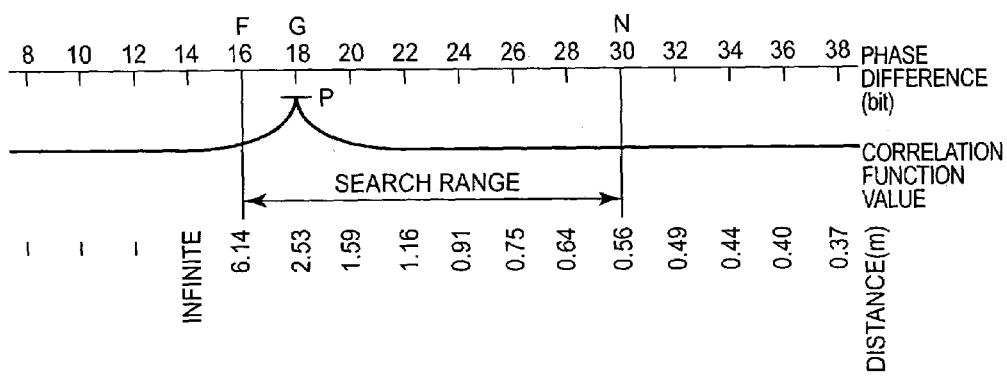
FIG. 13 is a diagram indicating a local maximum value of correlation function, in a case where pre-distance-measuring is carried out.

The projection light conversion device 24 projects the chart generated by the horizontal chart generating unit 26 on the screen 2, and the distance-measuring sensors 31A and 31B receive the reflection light of the chart. In a case where this kind of pre-distance-measuring is carried out, the local maximum value of correlation function value becomes only one, such as shown in FIG. 13.

The sensor controller 32A adopts the phase difference obtained by the pre-distance-measuring, as a reference value, at the time of the real distance-measuring. Namely, the sensor controller 32A sets a searching range, where the local maximum value of correlation function value becomes only one, and the local maximum value can be accurately obtained even if an error margin occurs at the time of pre-distance-measuring, based on the phase difference. The sensor controller 32A carries out the real distance-measuring, and obtains the inclination angle θA, by obtaining the phase difference which the correlation function becomes local maximum, in the searching range set in this way.

In the same way as the sensor controller 32A, the sensor controller 32B carries out pre-distance-measuring of a vertical direction, and sets a searching range based on the phase difference obtained by the pre-distance-measuring. Then, when carrying out the real distance-measuring, the sensor controller 32B obtains the inclination angle θB, by obtaining the phase difference which the correlation function becomes local maximum, in the searching range set in this way.

Next, operation of the projector 1 according to the second embodiment, will be described.

Figure 14:
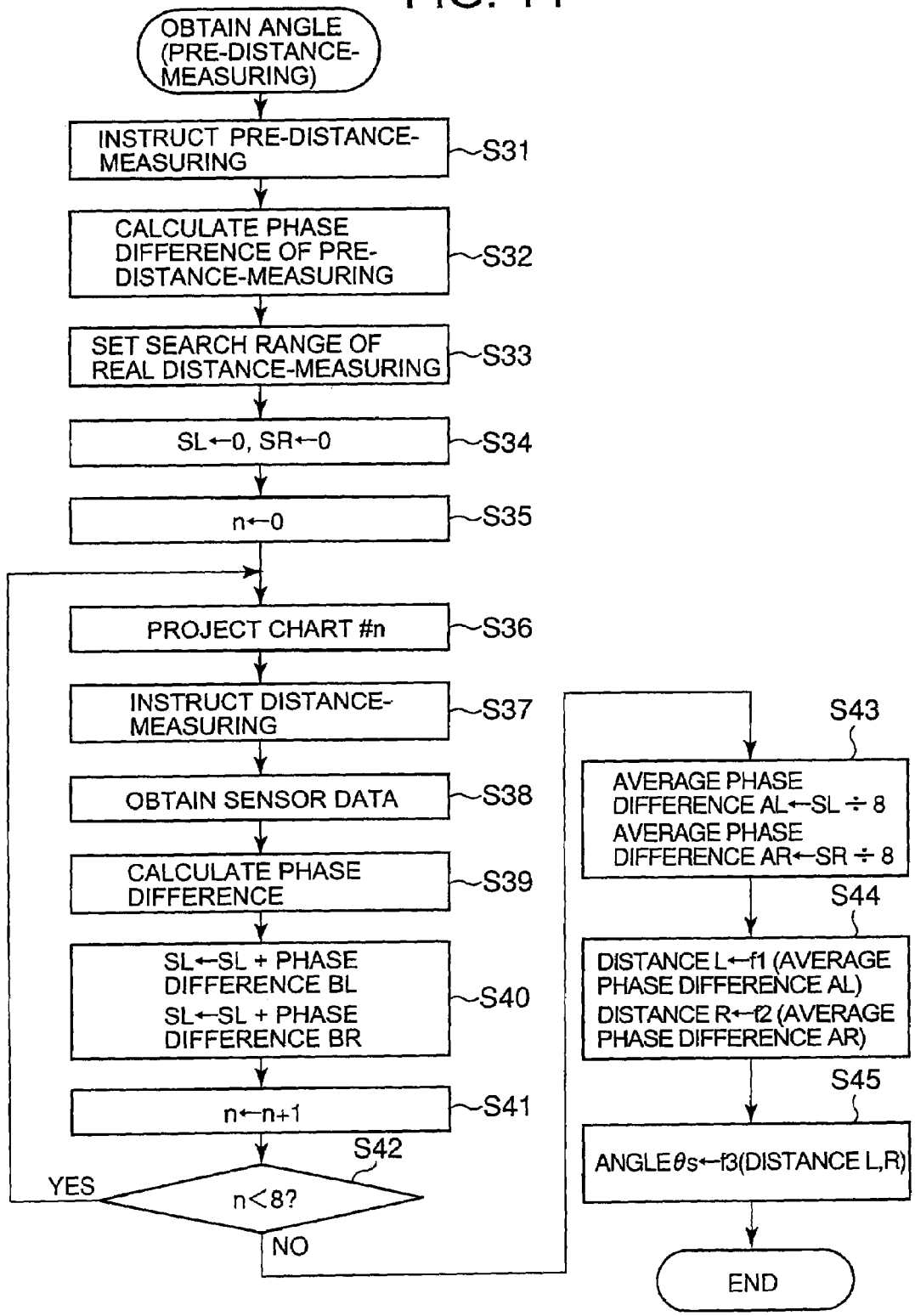
FIG. 14 is a flowchart showing operation of the projector according to the second embodiment of the present invention.

When the projector control unit 13 sends a starting order for sensor operation to each of the sensor controller 32A and 32B, the sensor controllers 32A and 32B carry out distance-measuring control. First, the sensor controller 32A carries out distance-measuring control, in accordance with the flowchart shown in FIG. 14.

The sensor controller 32A carries out instructions for drawing, to the horizontal chart generating unit 26 and the signal selection unit 23, and instructs the distance-measuring sensor 31A to carry out pre-distance-measuring (step S31).

In accordance with instructions for drawing the horizontal chart, the horizontal chart generating unit 26 generates a chart for pre-distance-measuring, such as shown in FIG. 12. In accordance with this instruction, the signal selection unit 23 selects and outputs the chart generated by the horizontal chart generating unit 26.

The projection light conversion device 24 projects the projection light of the chart on the screen 2, and the distance-measuring sensor 31A receives the reflection light thereof.

The sensor controller 32A obtains the sensor data of the result of the distance-measuring that the distance-measuring sensor 31A carries out, and calculates the phase difference when carrying out the pre-distance-measuring, by obtaining the correlation function value based on the obtained sensor data (step S32).

Based on the calculated phase difference, the sensor controller 32A sets a searching range in a case where real distance-measuring is carried out (step S33).

When the searching range is set like this, in the same way as the first embodiment, the sensor controller 32A obtains the average phase difference by carrying out real distance-measuring (step S34 to 43), and obtains distances L and R, based on the obtained average phase difference (step S44). Then, the sensor controller 32A obtains the angle θs based on the obtained distances L and R (step S45).

The sensor controller 32B also carries out distance-measuring control in the same way as the sensor controller 32A, and obtains the angle θs.

The operation of the projector 1 will be further described concretely.

Figure 15:
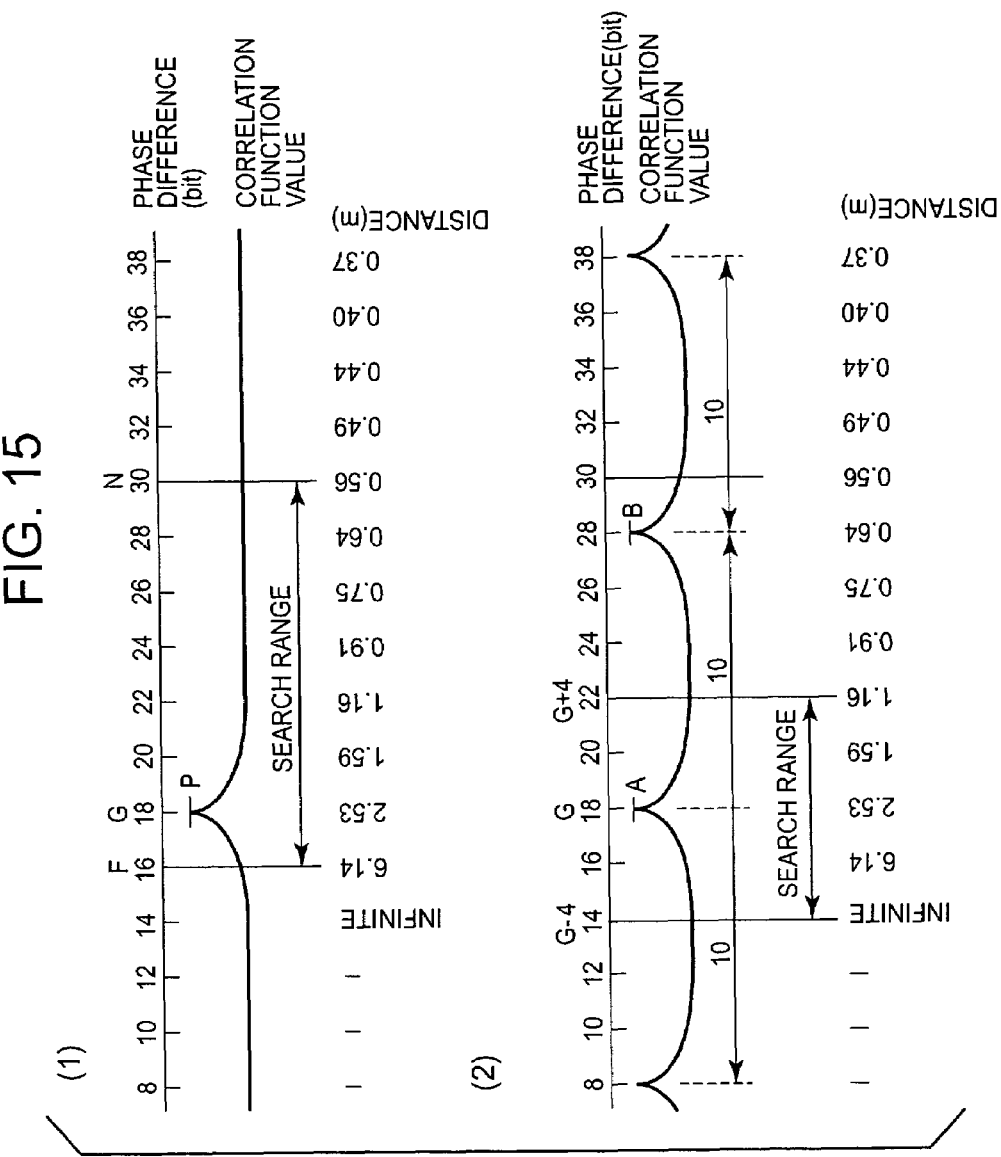
FIG. 15 is a diagram showing the relationship between the local maximum value of correlation function and the search range, in a case where pre-distance-measuring is carried out.

By the projector 1 carrying out pre-distance-measuring, as shown in FIG. 15 (1), the local maximum value of correlation function value exists only when the phase difference is 18 bits. As described above, in the case of pre-distance-measuring, there is only one local maximum value, which is when the phase difference is 18 bits.

The sensor controllers 32A and 32B set the searching range, setting the phase difference of 18 bits, which the correlation function value becomes local maximum, as a center phase difference G. The searching range is set so that there is only one local maximum value in a case where real distance-measuring is carried out, and the local maximum value can be accurately obtained even if an error margin occurs at the time of pre-distance-measuring, and the searching range becomes narrower than in a case where pre-distance-measuring is not carried out. The sensor controller 32A sets the searching range to for example G±4, such as shown in FIG. 15 (2) (processing of step S33).

As a result of the projector 1 carrying out a real distance-measuring, setting the search range in this way, it is assumed that the correlation function value becomes local maximum at a phase difference of 18 bits, within this search range. In this case, even if the local maximum value B is larger than the local maximum value A, the sensor controller 32A determines that the distance 2.53 meters when the phase difference is 18 bits, is the correct measuring result.

Figure 16:
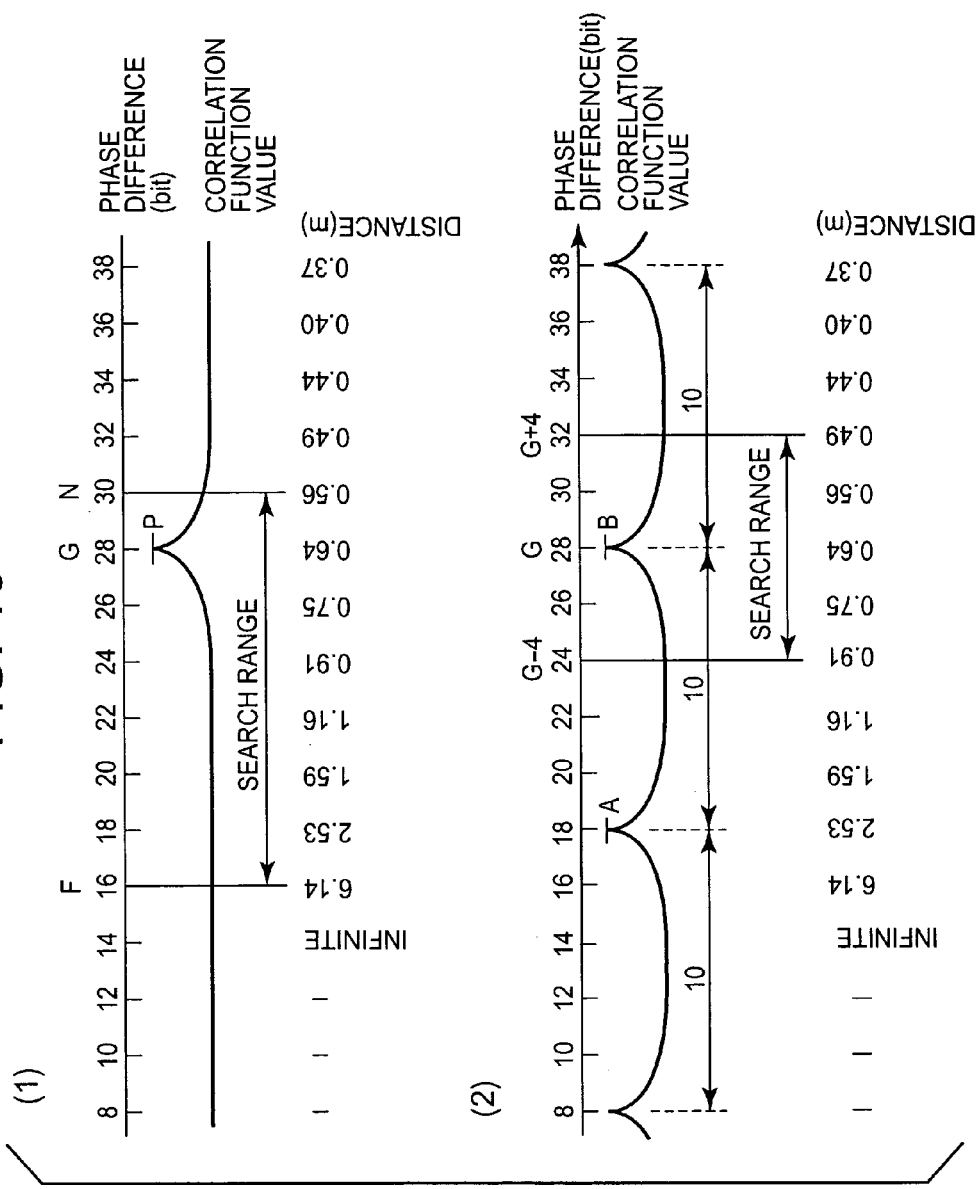
FIG. 16 is a diagram showing the relationship between the local maximum value of correlation function and the search range, in a case where pre-distance-measuring is carried out.

On the other hand, as shown in FIG. 16 (1), it is assumed that by the projector 1 carrying out pre-distance-measuring, the local maximum value of correlation function value exists when the phase difference is 28 bits. The local maximum value in the case of the pre-distance-measuring, becomes only one, when the phase difference is 28 bits.

The sensor controller 32A sets the searching range to for example G±4, setting the phase difference of 28 bits, where the correlation function value becomes local maximum, as the center phase difference G (processing of step S33).

As a result of the projector 1 carrying out real distance-measuring, setting the search range in this way, it is assumed that the correlation function value becomes local maximum at a phase difference of 28 bits, within this search range. In this case, even if the local maximum value A is larger than the local maximum value B, the sensor controller 32A determines that the distance 0.64 meters, when the phase difference is 28 bits, is the correct measuring result.

In this way, in a case where the projector 1 carries out real distance-measuring using equal distance sequential stripped pattern charts, even if local maximum points of correlation function value exists in 18 bits and 28 bits, mistaken distance-measuring can be prevented, by setting the search range based on the measuring results of the pre-distance-measuring.

As described above, according to the second embodiment, the projector 1 carries out pre-distance-measuring using a chart such as the one shown in FIG. 12, before the real distance-measuring using the charts #0 to #7, and the search range is set so that there is only one local maximum point, based on the sensor data obtained as a result of distance-measuring. Therefore, the search range becomes narrower than in a case where pre-distance-measuring is not carried out, and mistaken distance-measuring can be prevented.

Figure 17:
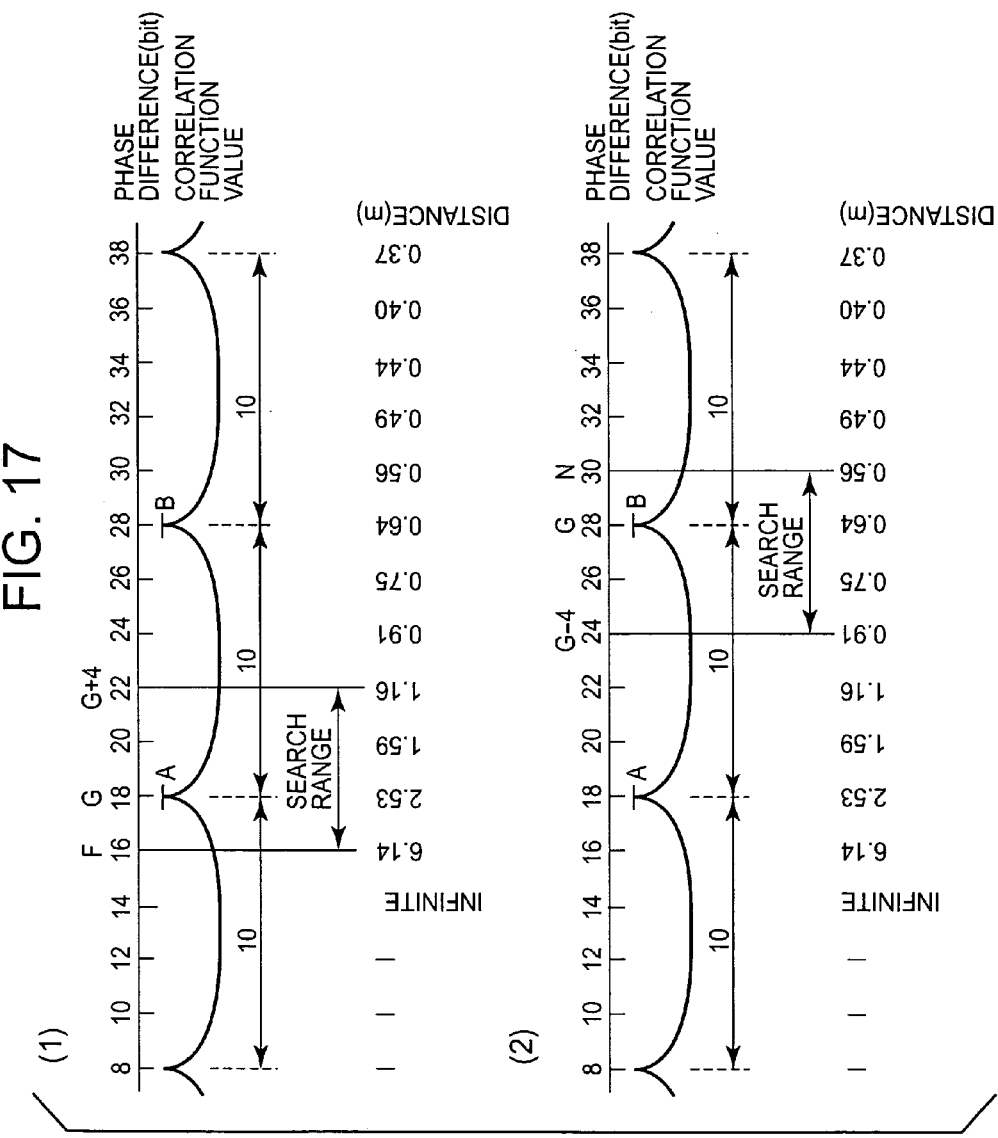
FIG. 17 is a diagram for describing an application of the second embodiment.

As shown in FIG. 17 (1) and (2), the logical product of search range G±4 bits, and search range 16 to 30 bits determined by the distance-measuring performance range of 0.6 to 6 meters, which is considered necessary, can be set as the phase difference search range. By doing so, the search range can be further narrowed, and mistaken distance-measuring can be more accurately prevented.

Figure 18:
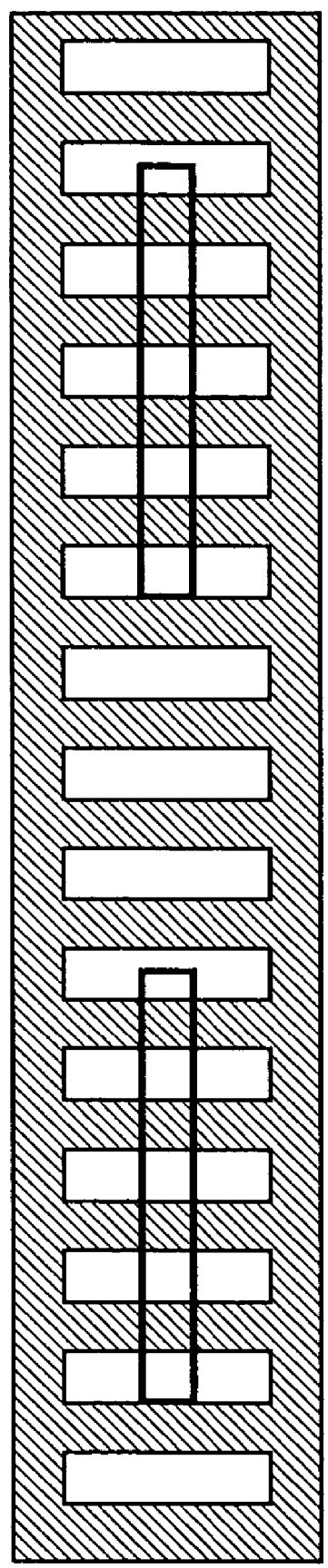
FIG. 18 is a diagram showing equal distance sequential stripped pattern charts which are twice pitched, used in pre-distance-measuring.

Instead of using an un-sequential chart, such as the chart shown in FIG. 12, the present invention can be constituted, so as to carry out pre-distance-measuring using equal distance sequential stripped pattern charts, such as shown in FIG. 18, that are twice the pitch of the equal distance sequential stripped pattern charts shown in FIG. 3.

Figure 19:
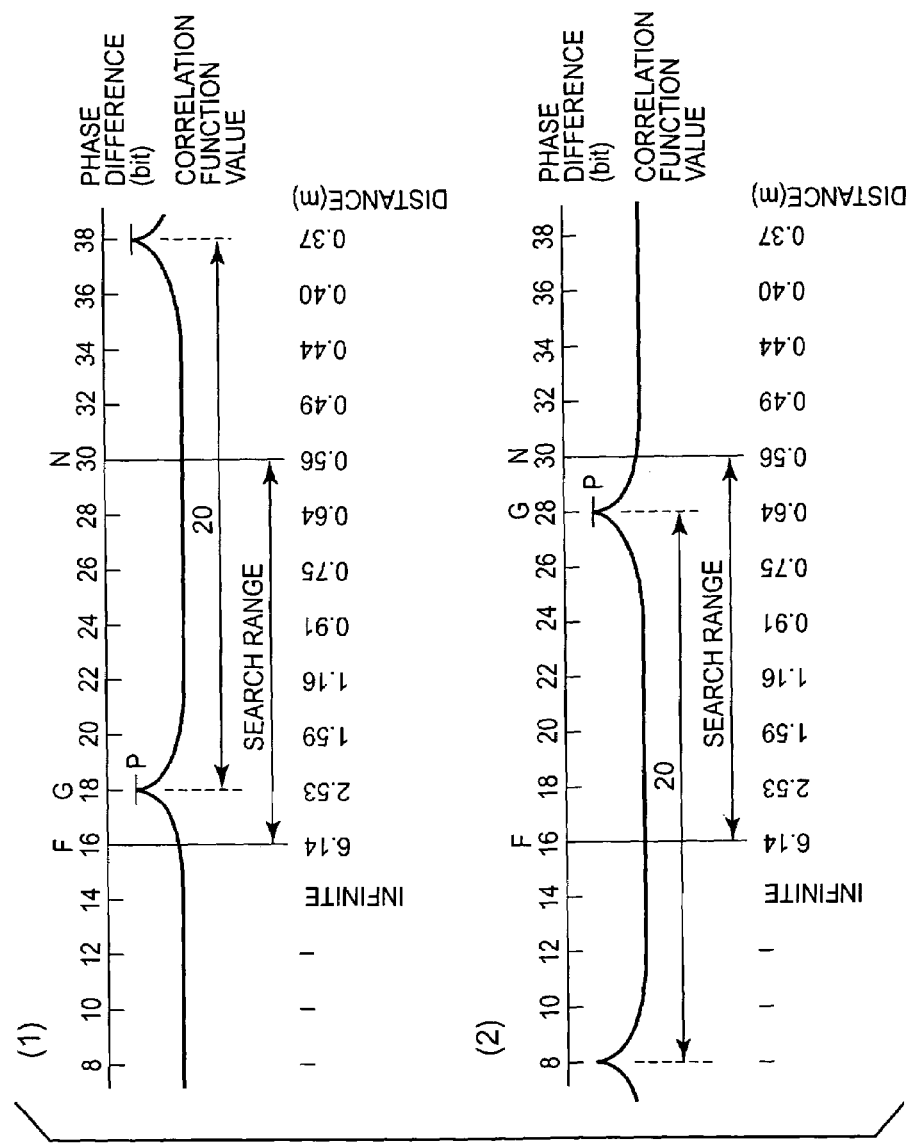
FIG. 19 is a diagram showing the relationship between the local maximum value of correlation function and the search range, in a case where pre-distance-measuring is carried out using the chart shown in FIG. 18.

In this case, there is a condition that the value adding the sensor pixel of twice the pitch to the primary phase difference, or a value subtracting the sensor pixel of twice the pitch from the primary phase difference, is not in the search range. As shown in FIG. 19 (1) and (2), because the chart pitch becomes twice the chart pitch of the charts #0 to #7 shown in FIG. 3, with the sensor pixel conversion, the chart pitch becomes 20 dots. Therefore, the local maximum point of correlation function value exists every 20 dots.

As shown in FIG. 19 (1), when the correlation function value becomes local maximum at 18 bits, the sensor controllers 32A and 32B set the search range of a range of for example, G±4, setting G=18 as the center.

As shown in FIG. 19 (2), when the correlation function value becomes local maximum at 28 bits, the sensor controllers 32A and 32B set the search range of a range of for example, G±4, setting G=28 as the center.

In this way, because only one local maximum point exists in the search range set by the pre-distance-measuring, mistaken distance-measuring is prevented. Therefore, in the same way as in the case of the un-sequential chart, the search range can be narrowed, as compared to a case where pre-distance-measuring is not carried out.

Third Embodiment

A projector according to a third embodiment of the present invention, prevents mistaken distance-measuring, by adjusting brightness of bright/dark sections of equal distance sequential charts, without carrying out pre-distance-measuring.

Figure 20:
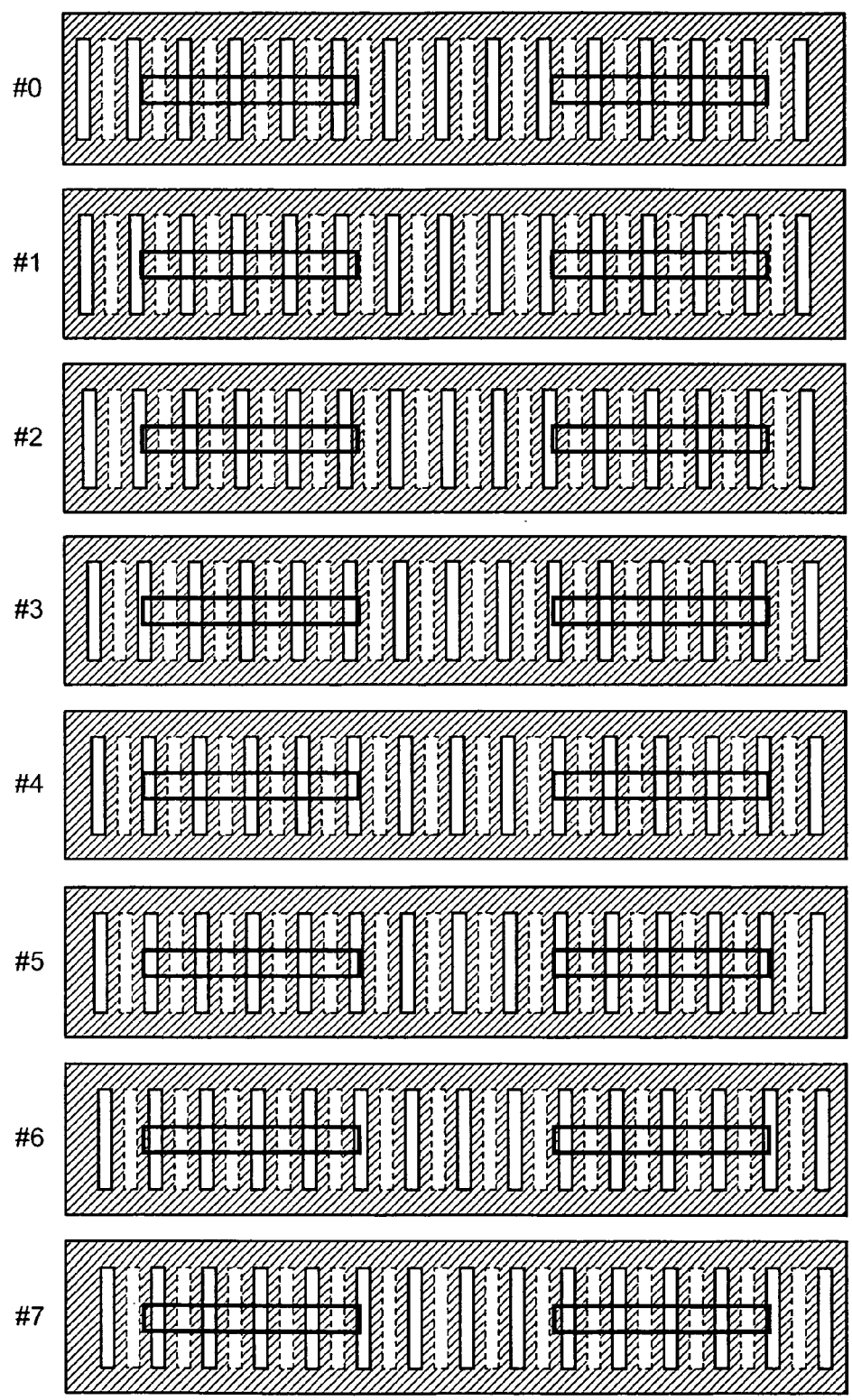
FIG. 20 is a diagram showing charts of the projector, according to the third embodiment.

The horizontal chart generating unit 26 of the projector 1 according to the third embodiment, generates charts #0 to #7, such as shown in FIG. 20. These charts #0 to #7 have equal distance sequential stripped patterns. In the same way as the horizontal chart generating unit 26, the vertical chart generating unit 27 also generates these kinds of equal distance sequential stripped pattern charts.

The equal distance sequential charts shown in FIG. 20 are constituted by adjusting the brightness of the white quadrangles shown by solid lines, and white quadrangles shown by dotted lines. For example, the brightness of the white quadrangles shown by solid lines is assumed to be 100%, and the brightness of the white quadrangles shown by dotted lines is assumed to be 80%.

Charts #0 to #7 shown in FIG. 20, are constituted so that the value adding the sensor pixel of twice the pitch to the primary phase difference, or a value subtracting the sensor pixel of twice the pitch from the primary phase difference, is not in the search range. Other than this, the structure of the charts, are the same as the charts shown in FIG. 3.

Figure 21:
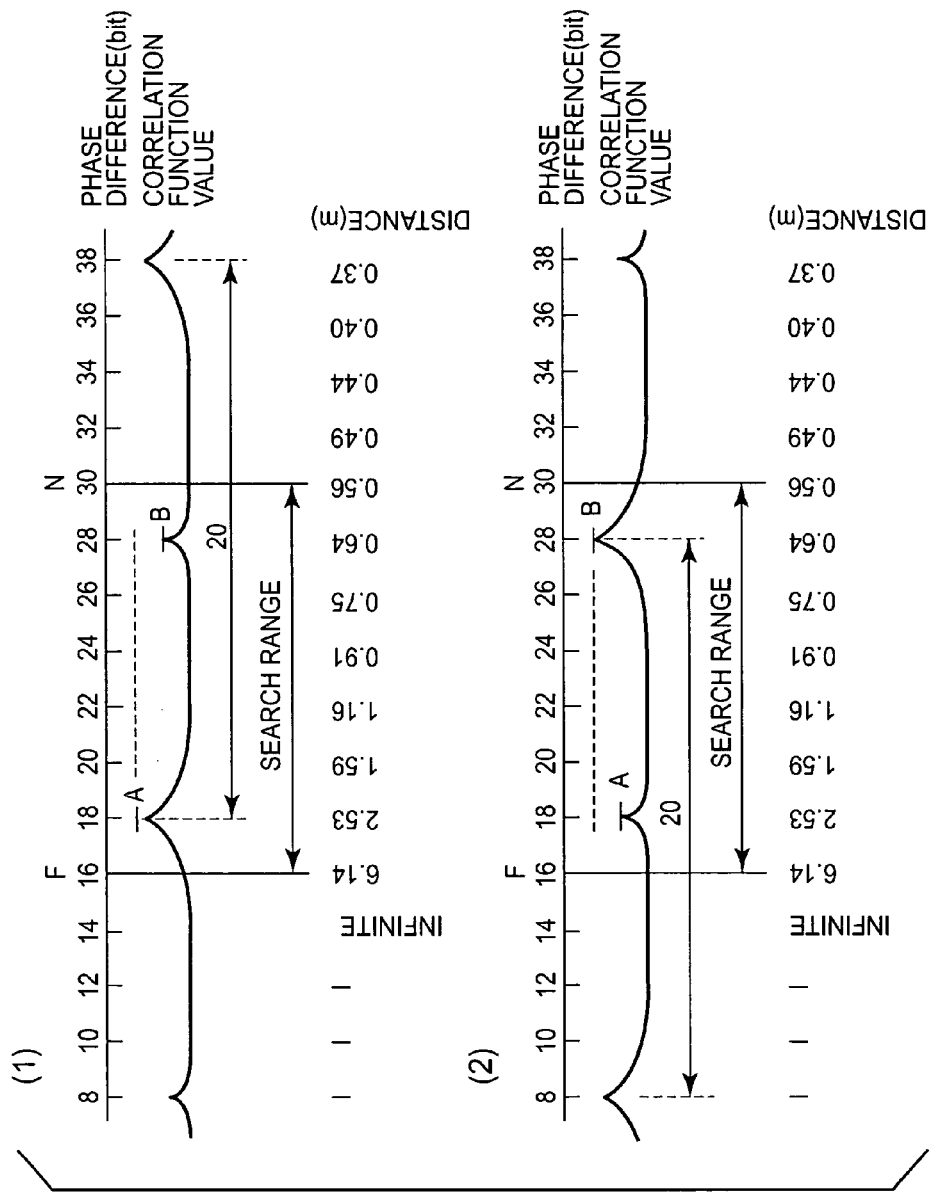
FIG. 21 is a diagram showing the relationship between the local maximum value of correlation function, which is a measured result, and the search range, in the projector shown in FIG. 20.

The correlation function values in a case where these kinds of charts are used, are shown in FIG. 21. One local maximum value, which differs in largeness, exists in the search range of each of the charts #0 to #7. The local maximum value of correlation function obtained by bright sections, which the brightness differ, becomes smaller. Therefore, by comparing the plurality of local maximum values, and disregarding the smaller values thereof, a correct phase difference can be detected.

In a case of a relationship shown in FIG. 21 (1), the local maximum value B is smaller than the local maximum value A. Therefore, it is determined that the local maximum value B is a local maximum value of correlation function obtained by bright sections, which the brightness differ. The sensor controllers 32A and 32B disregard the local maximum value B, and determines that 18 bits is the correct phase difference.

On the other hand, in a case of a relationship shown in FIG. 21 (2), the local maximum value A is smaller than the local maximum value B. Therefore, the sensor controllers 32A and 32B disregard the local maximum value A, and determines that 28 bits is the correct phase difference.

In this way, mistaken distance-measuring can be prevented. Also, according to the third embodiment, because it is not necessary to carry out pre-distance-measuring, the entire measuring time can be shortened.

The present invention is not limited to the above embodiments, and various embodiments can be considered.

For example, in the above embodiments, average phase difference, where the error margin is small, is obtained by averaging the phase differences including a plurality of error margins, and the distance is obtained from the obtained average phase difference. However, the same effect as above can be obtained by respectively calculating the distance including a plurality of error margins, from the phase difference that includes a plurality of error margins, and obtaining the average distance with a small error margin, by averaging the distances that include the plurality of error margins.

In the above embodiments, a case where the inclination angle detection device is applied to a projector, is described. However, the inclination angle detection device can be applied in a case where for example, the inclination of walls, etc., of buildings are to be detected. In this case, the inclination angle of the wall is detected by projecting projection light towards the wall, the wall of the building being set as the projection surface.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-290751 filed on Aug. 8, 2003, and including specification, claims, drawings and summary. The disclosure of the above Japanese Patent Application is incorporated herein by reference in its entirety.

What is claimed is:

1. An inclination angle detection device comprising:
a chart drawing unit which draws an equal distance sequential pattern chart, which has patterns so that bright sections are sequentially placed in equal distances, by sequentially projecting the projection light of the equal distance sequential pattern chart to a projection surface, while shifting the patterns;
sensor units which comprise a plurality of light receiving units that are placed having predetermined distances from each other, setting a center line as the center, and sequentially receives the reflection light of the equal distance sequential pattern charts, that are drawn on the projection surface, at the plurality of light receiving units; and
inclination angle obtaining units wherein the sensor units sequentially obtain the average distance between the projection point of the projection light and equal distance sequential pattern charts, based on a plurality of phase differences at the time when the reflection light of the equal distance sequential pattern chart is received, the sum of each lag amount between the imaging position on the light receiving unit when the sensor unit receives a parallel light, and the imaging position on the light receiving unit when the sensor unit receives the reflection light of the equal distance pattern chart being set as the phase difference, and obtain the inclination angle of the projection surface based on the obtained average distance.

2. The inclination angle detection device according to claim 1, wherein the inclination angle obtaining unit obtains the average phase difference, based on the plurality of phase differences at the time when the sensor unit sequentially receives the reflection of the equal distance sequential pattern charts, and obtains the average distance between the projection point of the projection light and the equal distance sequential pattern charts, based on the obtained average phase difference.

3. The inclination angle detection device according to claim 1, wherein the chart drawing unit is constituted so as to draw the charts by shifting the patterns of the projection light of the charts by a number which is equal to or larger than 4 and is in multiples of 2, and sequentially projecting the patterns to the projection surface.

4. The inclination angle detection device according to claim 1, wherein the chart drawing unit is constituted so as to draw the charts by selecting at least two sets of sets of four values divided by 90 degrees, as the angle to be shifted, setting the pitch of the bright/dark section as 360 degrees, and sequentially projecting the patterns of the projection light of the charts to the projection surface, while shifting the patterns of the projection light of the charts by the predetermined angles.

5. The inclination angle detection device according to claim 2, wherein:
the chart drawing unit projects the projection light of an un-sequential chart wherein the bright/dark sections are placed only in a predetermined range on left and right sides respectively so that there is only one local maximum value of a correlation function value that indicates the correlation of the sensor data that each light receiving unit receives, to the projection surface, before projecting the equal distance sequential pattern charts to the projection surface; and
the inclination angle obtaining units are constituted to obtain the local maximum value of the correlation function value, by obtaining sensor data at the time reflection light from the un-sequential chart is received from the sensor units, and obtain the average phase difference, by setting the search range of the average phase difference so that the average phase difference at the time the sensor units receive the reflection light of the equal distance sequence charts, is specified based on the obtained local maximum value.

6. The inclination angle detection device according to claim 2, wherein:
the chart drawing unit projects the projection light of the twice pitched equal distance sequential pattern charts that have a pitch twice as large as the pitch of the equal distance sequential pattern charts, wherein the distances of the bright/dark sections are set so that the local maximum value of correlation function value indicating the correlation of the sensor data that each light reception unit of the sensor units receives, is at least twice the local maximum value of correlation function value at the time the sensor units receive the reflection light of the equal distance sequential chart, on the projection surface, before projecting the equal distance sequential pattern charts on the projection surface; and
the inclination angle obtaining units are constituted to obtain the local maximum value of the correlation function value, by obtaining sensor data at the time reflection light from the twice pitched equal distance sequential pattern charts is received from the sensor units, and obtain the average phase difference, by setting the search range of the average phase difference so that the average phase difference at the time the sensor units receive the reflection light of the equal distance sequence charts, is specified based on the obtained local maximum value.

7. The inclination angle detection device according to claim 1, wherein the chart drawing unit draws the equal distance sequential pattern charts by sequentially projecting the projection light of the equal distance sequential pattern charts, wherein the brightness of the bright/dark sections are adjusted, on the projection surface, while shifting the pattern.

8. A method comprising:
a drawing step of drawing an equal distance sequential pattern chart, which has patterns so that bright sections are sequentially placed in equal distances, by sequentially projecting the projection light of the equal distance sequential pattern chart to a projection surface, while shifting the patterns;
a light receiving step of sequentially receiving reflection light from the equal distance sequential pattern charts drawn on the projection surface, at receiving units that are placed having predetermined distances from each other; and
an inclination obtaining step of sequentially obtaining the average distance between the projection point of the projection light and equal distance sequential pattern charts, based on a plurality of phase differences at the time when the reflection light of the equal distance sequential pattern chart is received, the sum of each lag amount between the imaging position on the light receiving unit when the sensor unit receives a parallel light, and the imaging position on the light receiving unit when the sensor unit receives the reflection light of the equal distance pattern chart being set as the phase difference, and obtaining the inclination angle of the projection surface based on the obtained average distance; and
a correction step of correcting an image signal to be projected to the projection surface based on the obtained inclination angle of the projection surface.

9. The inclination angle detection device according to claim 1, wherein each of the sensor units receives the reflection light from left-hand and right-hand distance measuring windows on the projection surface, and each of the distance measuring windows includes a point serving as a distance measuring point such that a line from the sensor unit measuring the distance measuring point to the distance measuring point is at an angle θw with respect to the center line of the sensor units, and wherein the inclination angle obtaining units obtain an inclination angle Os of the projection surface for each of the sensor units by calculating the formula:

$$\theta s = \arctan\left(\frac{R-L}{R+L} \cdot \cot \theta w\right) \quad \text{[Formula 9]}$$

based on an average distance L and average distance R from a projector which projects the projection light to a left-hand one of the distance measuring points and a right-hand one of the respective distance-measuring points, respectively, in the two distance-measuring windows on the projection surfaces, and based on the angle θw.

\* \* \* \* \*